United States Patent
Lam

(10) Patent No.: US 7,411,363 B2
(45) Date of Patent: Aug. 12, 2008

(54) CONSERVATION OF ELECTRICAL ENERGY AND ELECTRO-MAGNETIC POWER IN MOTOR, GENERATOR, AND PRODUCT COMPONENTS

(76) Inventor: Dat D. Lam, E. 7011 10th St., Spokane, WA (US) 99212

( * ) Notice: Subject to any disclaimer, the term of this patent is extended or adjusted under 35 U.S.C. 154(b) by 0 days.

(21) Appl. No.: 11/426,571

(22) Filed: Jun. 26, 2006

(65) Prior Publication Data

US 2007/0296373 A1 Dec. 27, 2007

(51) Int. Cl.
*H02P 7/00* (2006.01)

(52) U.S. Cl. .................. 318/130; 318/293; 318/727; 318/558

(58) Field of Classification Search ........... 318/126, 318/129–130, 254, 291–294, 510, 558, 139, 318/254.1, 400.29, 438, 440–441, 727; 388/907.2, 388/922

See application file for complete search history.

(56) References Cited

U.S. PATENT DOCUMENTS

| | | | | | |
|---|---|---|---|---|---|
| 3,313,993 | A | * | 4/1967 | Rupp | 318/254 |
| 3,560,817 | A | * | 2/1971 | Amato | 318/254.1 |
| 3,568,023 | A | * | 3/1971 | Conrad | 318/244 |
| 3,597,531 | A | * | 8/1971 | De Marinis et al. | 455/163.1 |
| 3,634,743 | A | * | 1/1972 | Ingenito | 318/400.41 |
| 4,064,442 | A | * | 12/1977 | Garron | 318/254 |
| 4,213,077 | A | | 7/1980 | Hornung et al. | |
| 4,668,898 | A | * | 5/1987 | Harms et al. | 318/254 |
| 4,682,093 | A | * | 7/1987 | Murphy et al. | 318/701 |
| 4,772,814 | A | | 9/1988 | Lewus | |
| 4,808,868 | A | | 2/1989 | Roberts | |
| 4,959,573 | A | | 9/1990 | Roberts | |
| 5,416,391 | A | * | 5/1995 | Correa et al. | 318/558 |
| 5,631,528 | A | * | 5/1997 | Agiman | 318/293 |
| 5,689,164 | A | | 11/1997 | Hoft et al. | |
| 5,739,650 | A | | 4/1998 | Kimura et al. | |
| 6,166,500 | A | | 12/2000 | Makaran | |
| 6,307,345 | B1 | | 10/2001 | Lewis | |
| 6,384,564 | B1 | | 5/2002 | Pollock | |
| 6,417,598 | B2 | | 7/2002 | Grehant | |
| 6,566,839 | B2 | | 5/2003 | DaSilva et al. | |
| 6,721,496 | B2 | | 4/2004 | Smith | |
| 6,847,186 | B1 | | 1/2005 | Kerlin | |
| 7,123,821 | B1 | * | 10/2006 | Hayden | 388/830 |

* cited by examiner

*Primary Examiner*—Bentsu Ro
(74) *Attorney, Agent, or Firm*—Yen Lam

(57) ABSTRACT

A capacitor, inductor, and power line are arranged in a series parallel combination tank circuit that operates over four quarters of a complete cycle. During the first quarter cycle: power is applied to the tank circuit, current flows through the inductor to the capacitor, current is stored in the inductor, and the capacitor is charged. During the second quarter cycle; current is released from the inductor as the capacitor discharges current to another parallel inductor or resistive load. During a third quarter cycle: current flows in the capacitor from the opposite direction, the capacitor is charged, current pushes out from the capacitor to the incoming power line, and current is stored in the inductor. During the fourth quarter cycle: the capacitor discharges in the opposite direction, current parallel to another inductor or resistive load flows in the opposite direction, and the inductor releases current to incoming power line.

33 Claims, 34 Drawing Sheets

System Overview

System Overview with H-Bridge Drive Circuit

System Overview with DC Drive

System Overview with Two H-Bridge Drive Circuit

H Bridge Drive (1/2 duty Cyl Power)

H-Bridge Drive Timing Waveform

DC Drive

DC Drive
Current and Voltage Graphs

Two H-Bridge Drive

Two H-Bridge Drive
Circuit Options for Drive 1

Two H-Bridge Drive
Circuit Options for Drive 2

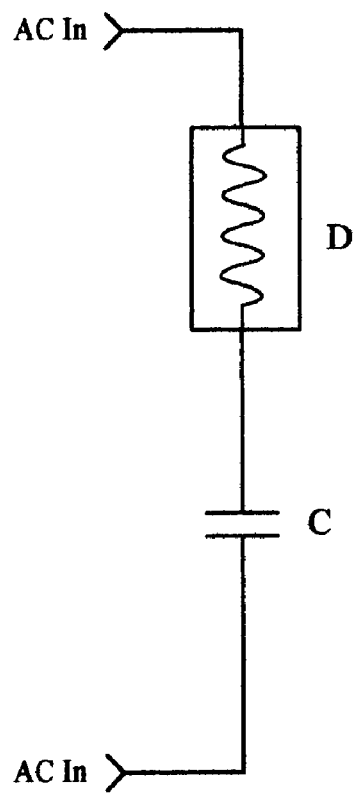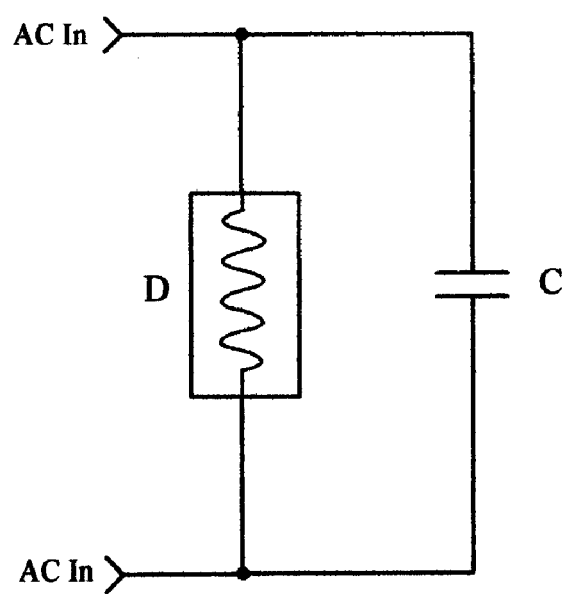
Fig. 5
Prior Art
Series Circuit
Fig. 6
Prior Art
Parallel Circuit Double-Wire Inductive Coil Winding Double-Wire Multi-Layers Same-Directional Winding Double-Wire Multi-Layers Same-Direction Winding Core Shaded Motor Double Winding Winding for Stator Motor Wiring for Squirrel Cage Motor Cross Section -
Squirrel Cage Motor Windings - Single Phase Squirrel Cage Motor -
Wiring in Series Squirrel Cage Motor -
Wiring in Series and Parallel Squirrel Cage Motor -
Wiring in Parallel Cross Section -
Squirrel Cage Motor Windings - Multi Phase - 0°

Cross Section -
Squirrel Cage Motor Windings - Multi Phase - 45°

Cross Section -
Squirrel Cage Motor Windings - Multi Phase - 90 °

Cross Section -
Squirrel Cage Motor Windings - Multi Phase - 135°

Squirrel Cage Motor Windings - Multi Phase
Timing Waveform 4-phase drive motor 2-phase drive motor 3-phase drive motor Circuit Example -
Bathroom Ventilation Fan and Light Bulb

CONSERVATION OF ELECTRICAL ENERGY AND ELECTRO-MAGNETIC POWER IN MOTOR, GENERATOR, AND PRODUCT COMPONENTS

BACKGROUND OF THE INVENTION a) Field of the Invention

The present disclosure relates generally to an apparatus, system and method for conserving energy in electromagnetic circuits that may include an inductor, motor, generator, and capacitor or condenser.

b) Background Art

The presently described invention has a variety of applications including the ability to reduce reliance on gasoline and diesel fuel. As will be described, an energy-efficient electromagnetic circuit can be utilized to power electric motors, generators, and other power related applications. Because of the uncertainty surrounding the cost and availability of gasoline and diesel fuel, the presently described features have the potential to reduce the use of petrochemical fuel by conserving electrical energy.

Electric motor efficiency is the measure of the ability of an electric motor to convert electrical energy to mechanical energy. An energy-efficient motor is a motor that gives the same mechanical output strength but uses less electrical energy input. To increase electric motor efficiency, the electric power consumption and motor losses must be reduced. Energy-efficient motors conserve electrical energy and may be used for a variety of uses, including within hybrid cars, to increase fuel-efficiency. Electrical motor power consumption efficiency (Efficiency) can be calculated by the following equation:

Efficiency=(100%)×(Mechanical power output)/(Electrical power input).

The present disclosure has evaluated numerous conventional motor-related circuits and identified new methods that realize power conservation that is approximately 150% to around 200% better than conventionally available motors.

BRIEF DESCRIPTION OF THE DRAWINGS

FIG. 5 is a circuit diagram of a conventional series circuit.

FIG. 6 is a circuit diagram of a conventional parallel circuit.

APPENDIX 1 is a graphical illustration of the test setup for comparing a conventional single-phase motor to a re-wound single-phase motor.

APPENDIX 2 is a detailed description of the test configuration and resulting data from comparative tests for the conventional single-phase motor and the re-wound single-phase motor of APPENDIX 1.

DETAILED DESCRIPTION OF THE PREFERRED EMBODIMENTS

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include both singular and plural references. The meaning of "in" includes "in" and "on".

Overview

Briefly stated, the present disclosure is related to an apparatus, system, and method of circuits and windings for electromagnetic power used to drive inductors, motors, generators, or any electromagnetic power source.

Electric power consumption for the electromagnetic power source is reduced yielding increased power conservation on the order of 150% to 200% more energy conservation than those conventionally available. One example system includes a capacitor, an inductor, and a power line that are arranged in a series parallel combination tank circuit that operates over four quarters of a complete cycle. During the first quarter cycle: power is applied to the tank circuit, current flows through the inductor to the capacitor, current is stored in the inductor, and the capacitor is charged. During the second quarter cycle;

current is released from the inductor as the capacitor discharges current to another parallel inductor or resistive load. During a third quarter cycle: current flows in the capacitor from the opposite direction, the capacitor is charged, current pushes out from the capacitor to the incoming power line, and current is stored in the inductor. During the fourth quarter cycle: the capacitor discharges in the opposite direction, current parallel to another inductor or resistive load flows in the opposite direction, and the inductor releases current to incoming power line.

Figure 1A:
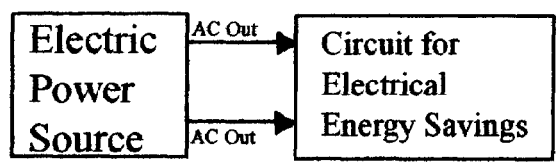
FIG. 1A is a block diagram of the system with a direct connection to the electric power source.
Figure 1B:
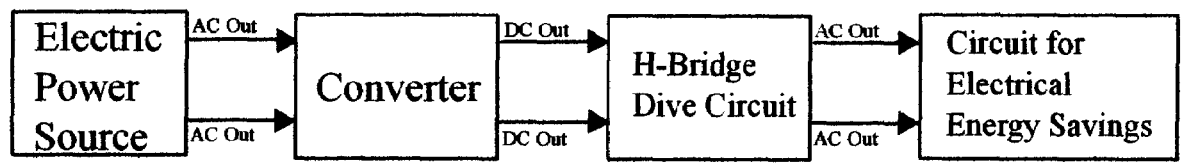
FIG. 1B is a block diagram of the system with conventional H-Bridge Drive Circuit.
Figure 1C:
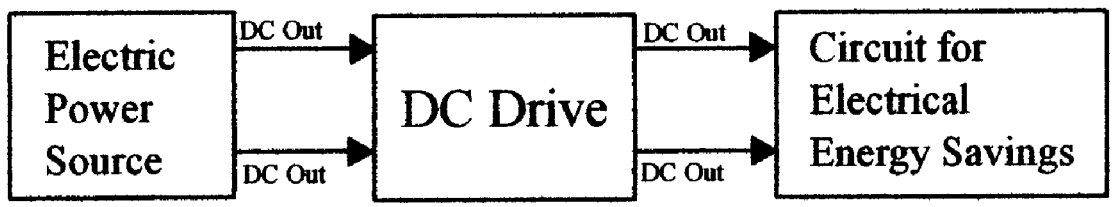
FIG. 1C is a block diagram of the system with DC Drive.
Figure 1D:
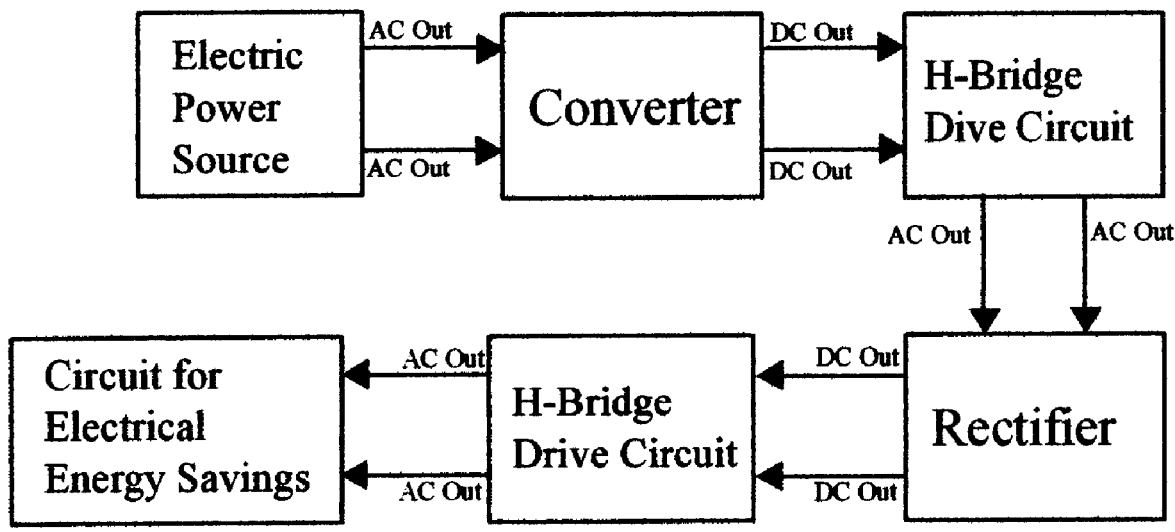
FIG. 1D is a block diagram of the system with Two-Bridge Drive Circuit.

FIGS. 1A-D are block diagrams that provide an overview of the present disclosure. FIG. 1A illustrates that the circuits discussed herein may be directly connected to a standard outlet if there is no need to control the speed of the motor. FIG. 1B illustrates that a conventional H-bridge drive may be used to provide the AC electrical output for any of the circuits discussed herein. FIG. 1C illustrates that the Electric Power Source may be an inverting DC electric power input used in conjunction with an inductive winding. FIG. 1D illustrates that an improved drive circuit, using two H-bridge drives, may be used to convert AC input electric power source into AC electrical output. The circuits described include an inductor or motor/generator with an inductive winding; and a capacitor or condenser. A conventional single-wire winding or double-wire winding, which is winding multiple layers in one direction, may be used with the presently described apparatus. Examples of the motors that may be used as the inductive windings will also be discussed.

Unlike the conventional series or parallel separate circuits, the present disclosure uses a series parallel combination tank circuit that is designed to utilize resonance theory, where the exchange of energy between the capacitor and inductor results in increased power output. The inductor stores and releases current in a forward and backward direction. The capacitor charges and discharges current from one inductor to another inductor or resistive load two times: one in the forward direction and one in the backward direction. Current flows in and out of a coil of the inductor such that an electromagnetic force of power is created that can be used for various applications.

The presently disclosed invention may be used with many different electro-mechanical apparatus including, but not limited to: steel-laminated core motors, shaded motors, stator motors, induction motors, single-phase motors, and multi-phase motors, to name a few.

Evaluated Circuits, Theories, and Topologies

A variety of conventional electrical resonant circuits have been identified and evaluated in contemplation of the present disclosure. One example conventional electro-magnetic machine is described in U.S. Pat. No. 4,959,573 to Roberts, which describes a single-phase dynamo-electric machine that can be a motor or generator that has regulated magnetic symmetry. Such resonant circuits can be formed from capacitors and inductors. Capacitors store energy in the form of an electric field, and electrically manifest that stored energy as a potential that is measurable as a voltage. Inductors store energy in the form of a magnetic field, and electrically manifest that stored energy as a kinetic motion of electrons that is measurable as a current. Capacitors and inductors can be arranged to store and release energy in complementary modes with a process that resembles the movement of a mechanical pendulum.

A capacitor and inductor can be arranged in a resonant circuit. For such circuits, resonance occurs as the result of the collapsing magnetic field of the inductor generating an electric current in its windings that charges the capacitor and the discharging capacitor provides an electric current that builds the magnetic field in the inductor. The capacitor and inductor components will exchange energy back and forth between each other when either the capacitor or inductor starts out in a charged state. The exchange of energy results in the creating of AC voltages and currents for each respective component. The instantaneous application of voltage to the resonant circuit will result in the rapid charging of the capacitor, while the inductor will oppose the instantaneous change in current, leaving the capacitor in the charged state and the inductor in the discharged state.

The present disclosure relates to an apparatus, system, and method that encompass much more than a single motor or generator. The present disclosure describes a complete system for energy-efficiency that uses resonance in a combined series/parallel circuit, two inductors/motors/generators, and can output to a resistive load or resistor. Evaluated conventional designs are not as energy-efficient. Unlike the evaluated conventional designs, the present disclosure's combined parallel and series circuit, windings, and balanced inductor and capacitor arrangements conserve more energy. The same power input that normally powers one motor in the conventional art, can now power two motors/inductors.

In the present disclosure, current flows through the windings and charges the capacitor. At 90 degrees, there is no current flowing and the capacitor discharges into the inductor. At 180 degrees, the current is flowing from the opposite direction and charges the capacitor. At 270 degrees, there is no current flowing and the capacitor discharges into the inductor.

Electric Power Source

FIGS. 2-4 illustrate example drive circuits that can utilize either an AC input source, or a DC input source as may be desired. A drive provides the excitation that causes an electrical motor to operate.

Figure 2A:
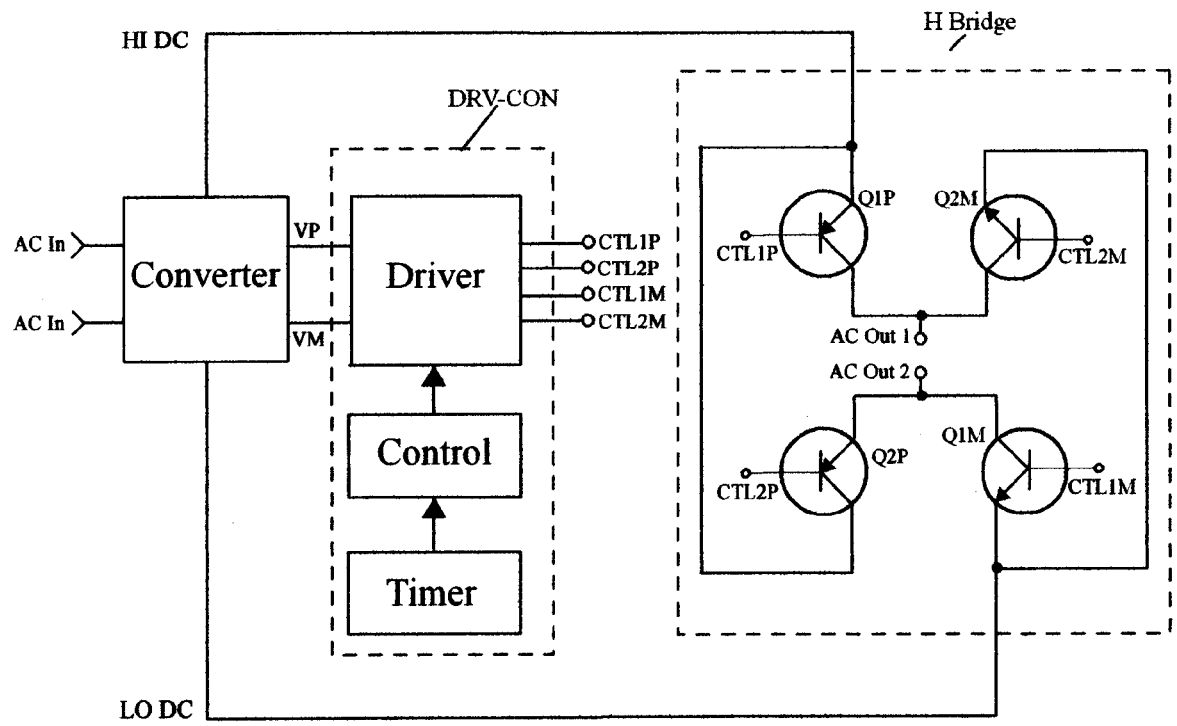
FIG. 2A is a schematic diagram of a conventional H-Bridge Drive.

FIG. 2A illustrates a conventional inverter circuit that uses an H-bridge to convert DC power to AC Power. For example, a H-Bridge drive can be used in cars to convert battery power to AC power. AC power is applied to the input (AC IN) of a converter (e.g., a rectifier, a half-wave rectifier, a full-wave rectifier, a single-phase rectifier, a multi-phase rectifier, a DC voltage regulator, a single-phase converter, a multi-phase converter, a pulse-width modulator converter, etc.). The converter is arranged to convert the AC input power to a DC power supply voltage (e.g., HI_DC and LO_DC, where HI_DC corresponds to the high power supply potential and LO_DC corresponds to the low power supply potential).

A driver circuit (DRIVER) is arranged to selectively activate portions of the H-bridge driver to create a pulsed output signal. The driver circuit (DRIVER) is arranged in cooperation with a timer control circuit (TIMER) to control the actuation of various switching mechanisms in the H-bridge circuit to adjust the various pulse widths of the AC output of the inverter.

The timing control circuit (TIMER) is responsive to a clock signal (CLOCK) to provide timing control signals to the driver circuit (DRIVER). The driver circuit is arranged to provide control signals to the H-bridge circuit such that the cycle-time for the actuation of each switching mechanism in the H-bridge driver circuit provides a desired AC output signal at the AC OUT terminals.

An example H-bridge circuit may include four transistors such as transistors Q1P, Q1M, Q2P, and Q2M. Transistor Q1P is an P-type bipolar junction transistor (BJT) that includes an emitter that is coupled to HI_DC, a collector that is coupled to terminal AC OUT 1, and a base that is coupled to signal CTL1P. Transistor Q1M is an N-type BJT that includes a collector that is coupled to terminal AC OUT 2, an emitter that is coupled to LO_DC, and a base that is coupled to signal CTL1M. Transistor Q2P is a P-type BJT that includes a collector that is coupled to HI_DC, a emitter that is coupled to AC OUT 2, and a base that is coupled to signal CTL2P. Transistor Q2M is a N-type BJT that includes a collector that is coupled to terminal AC OUT 1, an emitter that is coupled to LO_DC, and a base that is coupled to signal CTL2M. Depending on the device needed, four N-type (NPN) transistors or two N-type and two P-type or Darlington type transistors may be used.

Figure 2B:
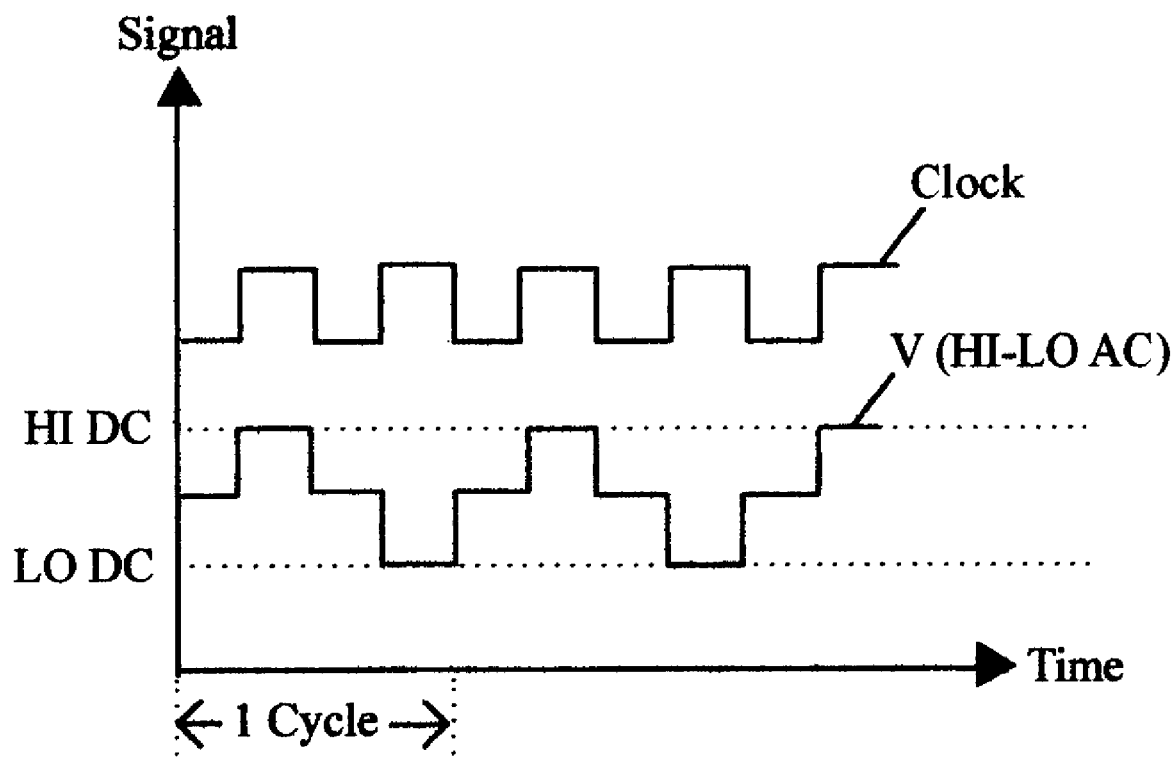
FIG. 2B is an illustrative plot of the timing waveform for the H-Bridge Drive.

The timer circuit cooperates with the driver circuit to provide signals CTL1P, CTL2P, CTL1M and CTL2M. Transistors Q1P and Q1M are selectively activated to generate a positive pulse between terminals AC OUT 1 and AC OUT 2, while transistors Q2P and Q2M are selectively activated to generate a negative pulse between terminals AC OUT 1 and AC OUT 2. The combination of the positive and negative pulses yields an AC output signal between terminals AC OUT 1 and AC OUT 2. The AC electrical output can connect to any of the circuits discussed herein. In FIG. 2B, the timing waveform for the H-Bridge Drive is compared with the clock signal.

Figure 3A:
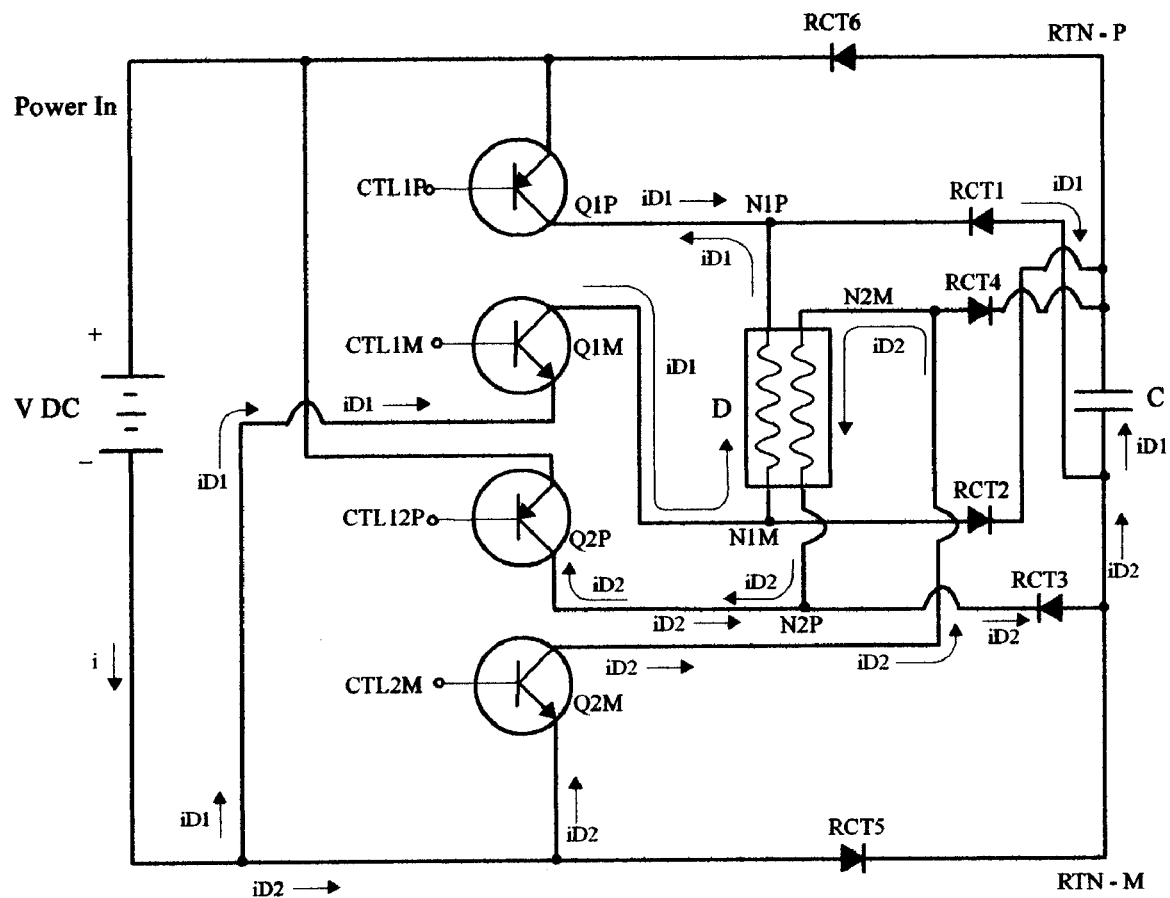
FIG. 3A is a schematic diagram of a DC Drive.

FIG. 3A is a schematic diagram that illustrates a DC drive circuit. The drive circuit includes four transistors (Q1P, Q2P, Q1M, and Q2M), six rectifiers (RCT1-RCT6), a double wire winding (D), and a capacitor (C). The four transistors are arranged to operate in a similar manner as the H-bridge driver of FIG. 2A. The physical wiring for the double wire winding is explained in the section, "Double Wire Winding." Current is traveling through the first winding of the double-wire winding (iD1) and current is traveling through the second winding of the double-wire winding (iD2).

As shown in FIG. 3A, the driver is separated for two inverting DC power to drive each winding of the double wire winding (D) in opposite directions. Transistors Q1M and Q1P are activated during a first half cycle relative to the input signal, and deactivated during a second half cycle. Similarly, transistors Q2M and Q2P are activated in the second half cycle and deactivated during the first half cycle.

When the power is on during the first half cycle, transistors Q1M and Q1P are active and an electrical current (iD1) flows through from Q1M through the first winding of the double wire winding (D) to Q1P until the end of the cycle. During the off-cycle, transistors Q1P and Q1M are off and the stored electrical current from the first winding (iD1) discharges through the first rectifier (RCT1) and the second rectifier (RCT2) to the capacitor (C), charging the capacitor (C).

During the second half cycle, Q2M and Q2P act the same as described for Q1M and Q1P. The current (iD2) flows from Q2M through the second winding of the double-wire winding (D) to Q2P. During the off-cycle, transistors Q2P and Q2M are off and the stored electrical current from the second winding discharges through the third rectifier (RCT3) and the fourth rectifier (RCT4) to the capacitor (C), charging the capacitor (C). Unlike the AC power input described in FIG. 2A, the DC drive circuit illustrated in FIG. 3A does not connect to the other circuits discussed herein. The inductive winding in FIG. 3A, however, may be replaced by the motors discussed herein.

Figure 3B:
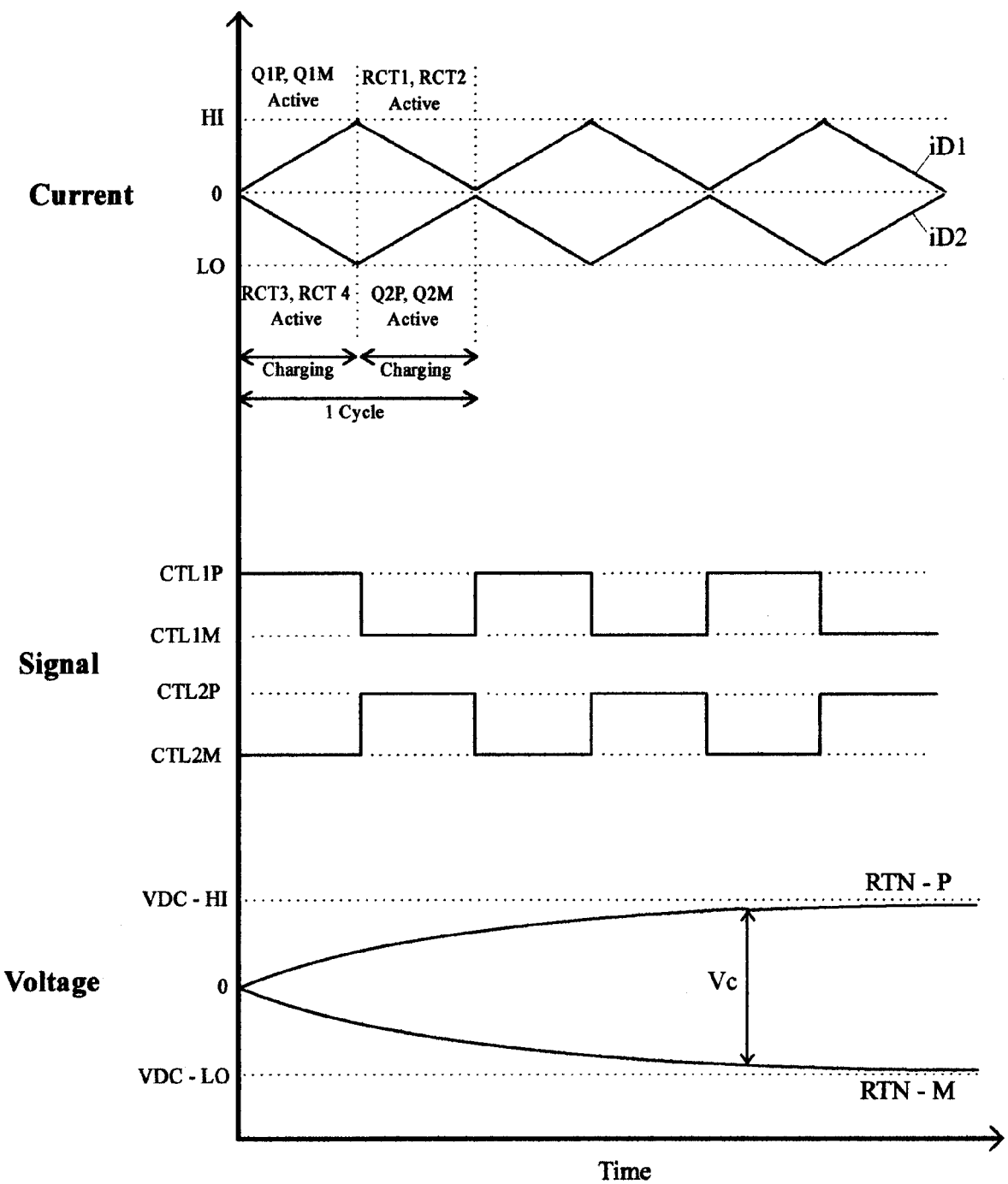
FIG. 3B is an illustrative graph of current versus signal versus voltage for the DC Drive.

As shown in FIG. 3B, the transistors Q1P and Q1M are active in the first half of the charging cycle and the transistors Q2P and Q2M are active in the second half of the charging cycle. Likewise, the third and fourth rectifiers (RCT3, RCT4) charge the capacitor in the first half of the charging cycle and the first and second rectifiers (RCT1, RCT2) charge the capacitor in the second half of the charging cycle. Therefore, the capacitor is charged twice in one complete cycle. The current returns to the power source when the capacitor voltage is the same as the input power source (VDC). FIG. 3B compares the currents iD1 and iD2 against the signals provided and voltage in the capacitor with respect to time.

Figure 4A:
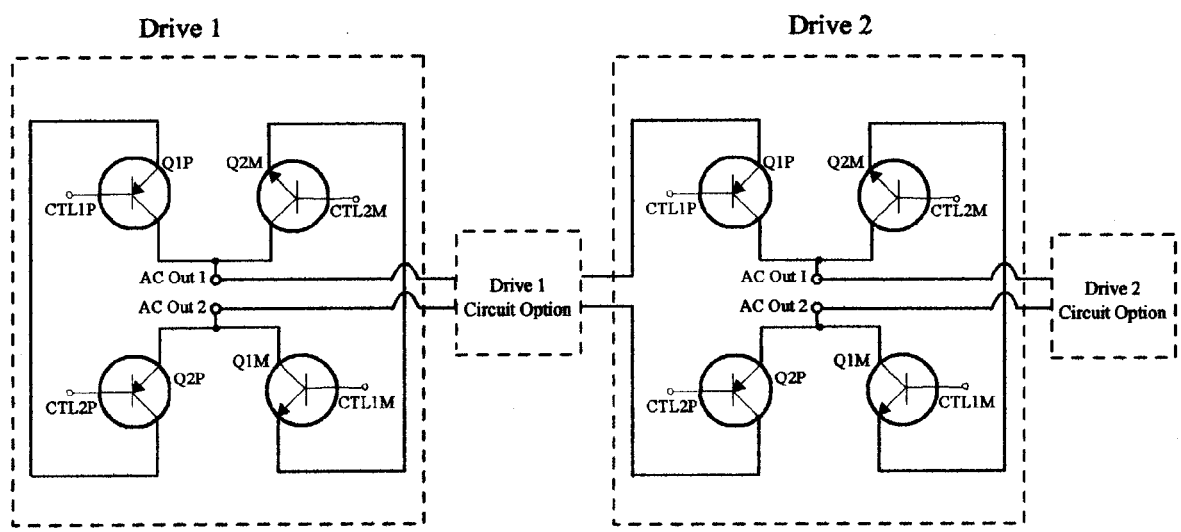
FIG. 4A is a schematic diagram of a Two H-Bridge Drive.
Figure 4B:
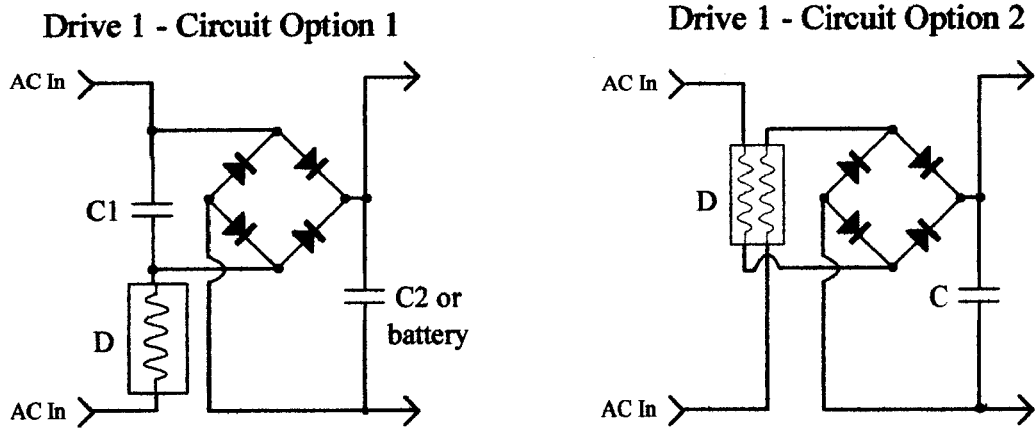
FIG. 4B illustrates the circuit options for Drive 1 in the Two H-Bridge Drive.
Figure 4C:
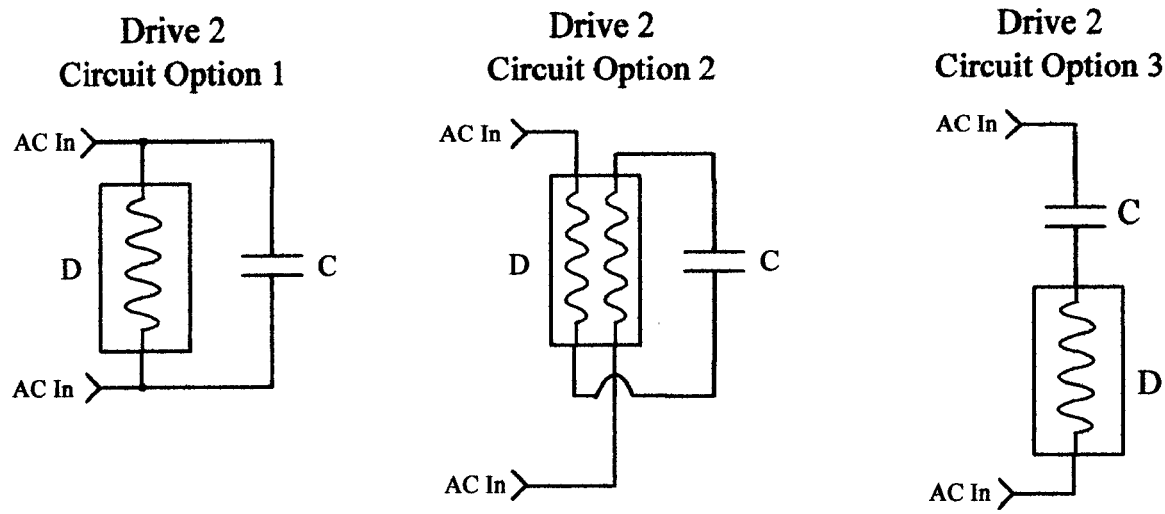
FIG. 4C illustrates the circuit options for Drive 2 in the Two H-Bridge Drive.

FIG. 4A shows an improved drive circuit, using two H-Bridge drives with circuit options for Drive 1 and Drive 2. Unlike the AC power input described in FIG. 2A, the improved drive circuit illustrated in FIG. 4A does not connect to the other circuits discussed herein. The inductive windings in FIG. 4A, however, may be replaced by the motors discussed herein. In FIG. 4B, there are two circuit options for Drive 1. The first option is a single wire winding (D) coupled in series to the capacitor (C1); said capacitor (C1) is coupled in parallel to a full-wave rectifier that is coupled in parallel to a capacitor (C2) or battery, as shown in Option 1. A second option is a double wire winding (D) coupled in parallel to a full-wave rectifier that is coupled in parallel with a capacitor (C), as shown in Option 2. In FIG. 4C, there are three options for Drive 2. The first option is a single wire winding (D) coupled in parallel to the capacitor (C), as shown in Option 1. The second option is a double wire winding (D) coupled in parallel to capacitor (C), as shown in Option 2. The third option is a single wire winding (D) coupled in series to capacitor (C), as shown in Option 3.

In the two H-Bridge Drive, a converter is arranged to convert AC input power to a DC power supply, the DRIVER is arranged to selectively activate portions of the first bridge drive, and the TIMER controls the actuation of various switching for the first bridge drive, as previously discussed for a conventional H-bridge drive. DC power is input through H bridge drive 1 to drive the inductive winding (D). The rectifier then converts AC power to DC power to charge capacitor (C2) (or battery) and a second DRIVER and second TIMER provides the DC power input to H bridge drive 2, which drives another circuit with inductive winding (D) to yield an AC output signal as discussed above.

Inductive Winding for Inductor, Motor, or Generator

When wire is wound into a coil configuration, the current flowing in the coil produces a magnetic field around the coil. In the present disclosure, wire may be wound around a core (which produces the inductor), in the stator of a motor, or in the windings of a generator. The motor's coils will be referred by the term "windings".

According to the present disclosure, single or double wire windings may be used for the inductive winding, depending on the power output needed. The inductive winding may be connected in series or parallel as discussed herein. One skilled in the art will appreciate that various folds may be made to the inductor, stator in the motor, or windings in the generator without departing from the spirit and scope of the present invention.

Example Circuits

Illustrative examples of electric circuits in accordance with the system will be described in detail below. As it will be apparent to one skilled in the art, however, the present disclosure is in no way limited to the illustrated embodiment or implementation.

The following key shall be used for the circuit drawings:

| Symbol | Description |
|---|---|
| IN | Electric Power In |
| C | Capacitor or Condenser |
| D | Inductive Winding (can be inductor, stator of motor, or windings in generator) |
| R | Resistive Load |
| T | Transformer |
| W | Winding |

In addition, the symbols + and − in the figures show the direction of current flow in the windings.

FIG. 5 shows a conventional series circuit. FIG. 6 shows a conventional parallel circuit.

In the present disclosure, the power output for the electromechanical device is increased by utilizing resonance theory. For example, in the series and combination circuit shown in FIG. 7, the wire in the inductive winding (D2) has two ends. One end of the wire connects to the second incoming AC power line node 10 and the other end is connected in series to one of two capacitor wires 12. The second capacitor wire connects to the first AC power line node 14. At the same time, two of the capacitor wires (16, 18) connect in parallel to another inductor (D1) or a resistive load (see FIG. 8), for example a light bulb.

When the power is applied, during the first quarter of cycle, 0 to 90 degrees, current flows through the inductor to the capacitor. As the capacitor is charged, current is stored in the inductor. During the second quarter of cycle, 90 to 180 degrees, current releases from the inductor as the capacitor discharges current to another parallel inductor or resistive load. During the third quarter of cycle, 180 to 270 degrees, current flows in the capacitor from the opposite direction, as the capacitor is charged at the same time. Current pushes out from the capacitor to the incoming power line as current is stored in the inductor. During the fourth quarter of the power cycle, 270 to 360 degrees, the capacitor discharges in the opposite direction, and current parallel to another inductor or resistive load flows in the opposite direction and the inductor releases current to incoming power line. One power cycle is completed.

The inductor stores and releases current in a forward and backward direction. The capacitor charges and discharges current from inductor to another inductor or resistive load two times: one in the forward direction and one in the backward direction. When current flows in and out of a coil of the inductor, it creates an electromagnetic force of power that can be used for various applications.

When incoming power is applied to the device, current stored in and out of the inductor charges the capacitor and the capacitor discharges to another inductor or resistive load. At the same time, there is voltage across the inductor. The voltage across the capacitor and the voltage across the inductor connected in parallel to the capacitor are equal.

There is voltage across the inductor connected in series to the capacitor and there is voltage across the inductor connected in parallel to the capacitor. Since Power=voltage× current, a single power input produces two branches of electromagnetic power output, increasing the power output. In the alternative, the present disclosure may have one electromagnetic power output with less energy input.

Single Wire Winding

Figure 7:
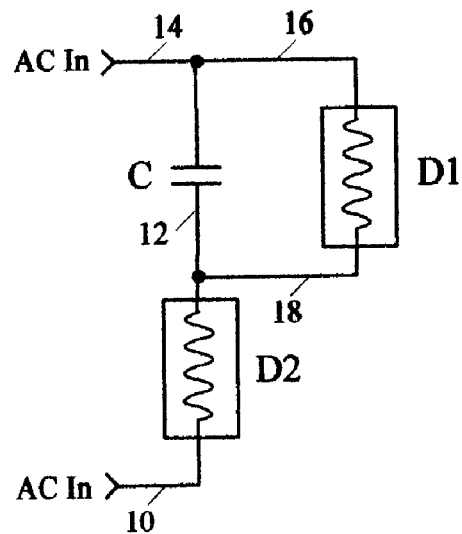
FIG. 7 is a circuit diagram of an illustrative single wire winding circuit.
Figure 8:
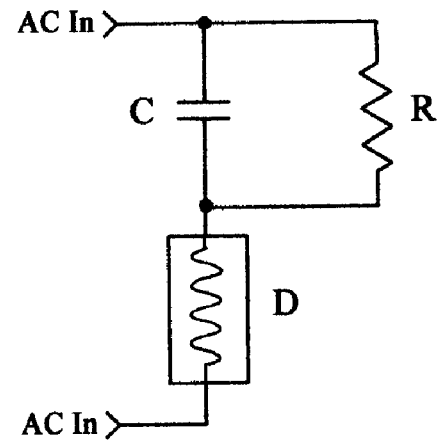
FIG. 8 is a circuit diagram of an illustrative single wire winding circuit.
Figure 9:
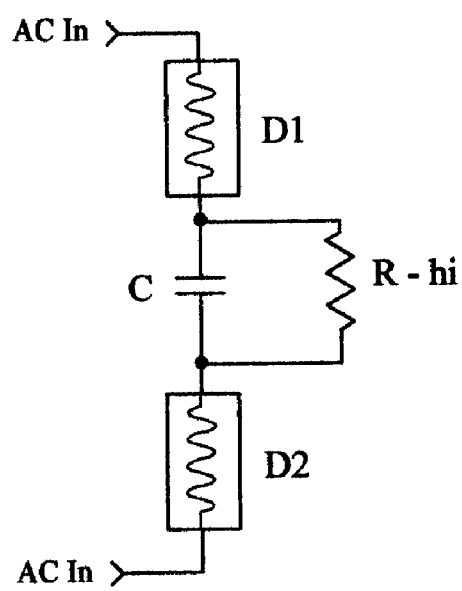
FIG. 9 is circuit diagram of an illustrative single wire winding circuit.
Figure 10:
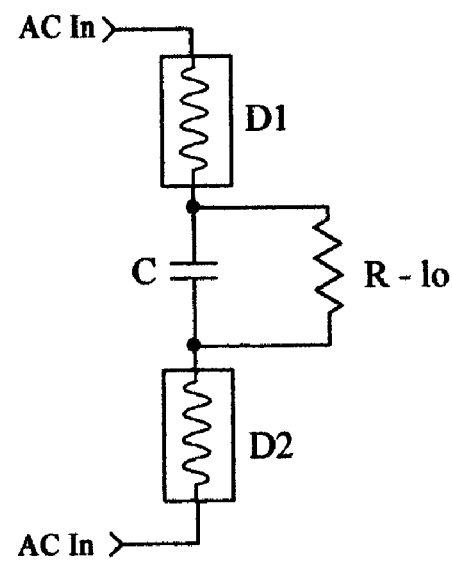
FIG. 10 is a circuit diagram of an illustrative single wire winding circuit.
Figure 11:
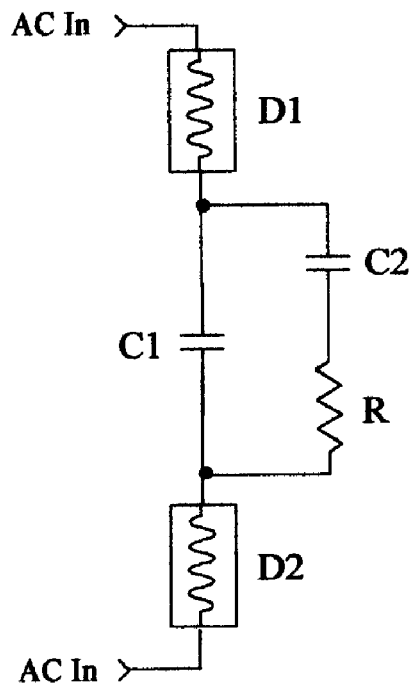
FIG. 11 is a circuit diagram of an illustrative single wire winding circuit.
Figure 12:
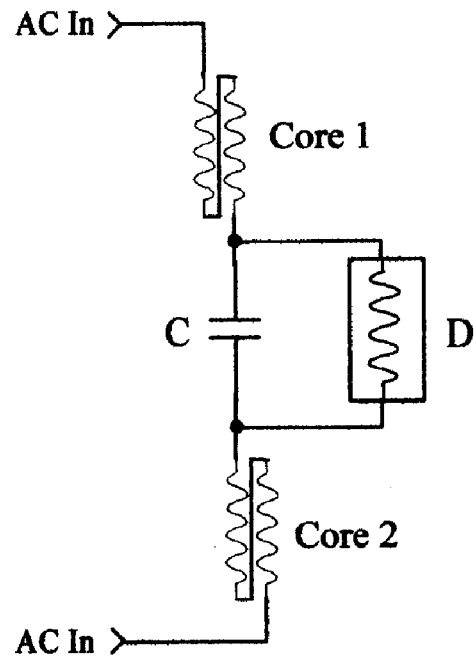
FIG. 12 is a circuit diagram of an illustrative single wire winding circuit.
Figure 13:
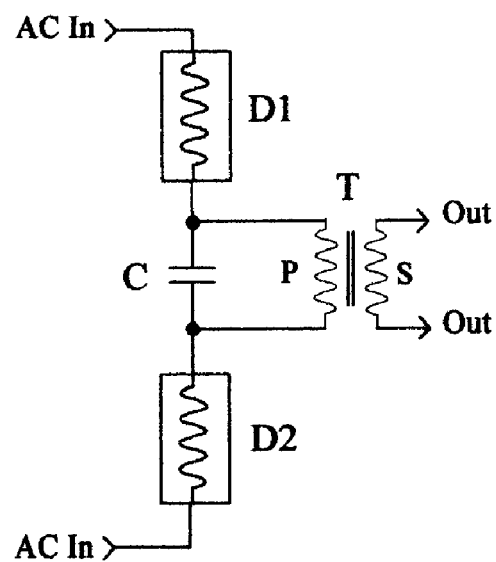
FIG. 13 is a circuit diagram of an illustrative single wire winding circuit.

FIGS. 7 through 13 illustrate circuits using single wire windings. FIG. 7 shows a series and parallel combination circuit. Two windings are coupled to the capacitor (C), one in series (D2) and one in parallel (D1). FIG. 8 shows the winding (D) coupled in series to the capacitor (C) and the capacitor (C) coupled in parallel to a resistive load (R). FIG. 9 shows two windings (D1 and D2) with a capacitor (C) coupled in between in series and the capacitor (C) coupled in parallel to a high resistive load (R). When power is stopped, the capacitor discharges to the resistor for safety reasons. FIG. 10 shows two windings (D1 and D2) with capacitor (C) coupled in between in series and the capacitor (C) coupled in parallel to a low resistive load (R). FIG. 11 shows two windings (D1 and D2) with capacitor (C) coupled in between in series and the capacitor (C) coupled in parallel to another capacitor (C2) series coupled to a (R) resistive load. FIG. 12 shows two cores (Core 1 and Core 2) with capacitor (C) coupled in between in series, and capacitor (C) coupled in parallel to a single wire winding (D). FIG. 13 shows two windings (D1 and D2) coupled with capacitor (C) in between in series and the capacitor (C) coupled in parallel to a transformer (T).

Double Wire Winding

Figure 14:
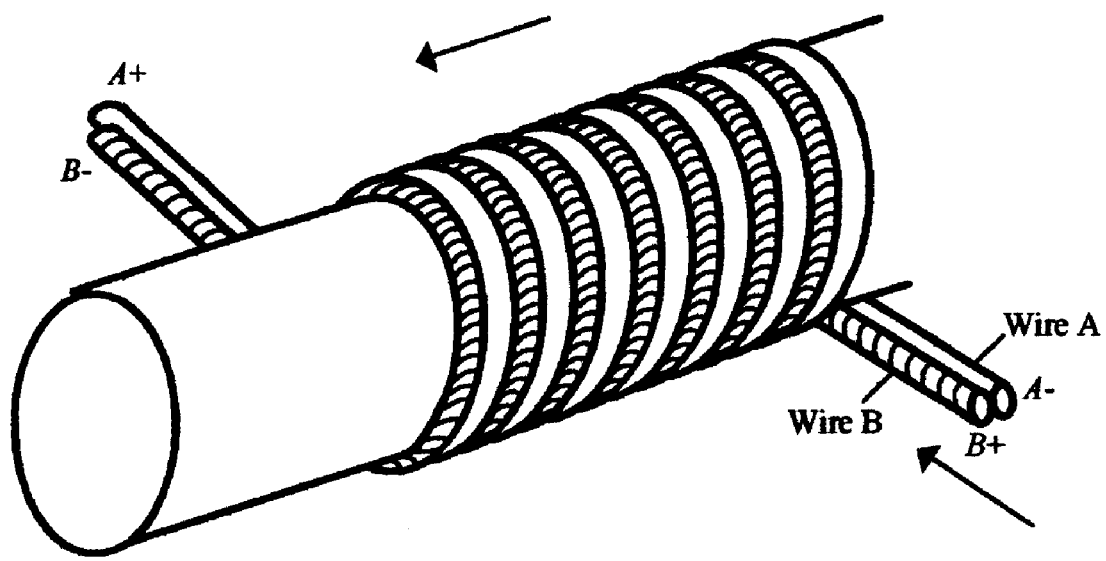
FIG. 14 is a graphical illustration of a double wire inductive coil winding.
Figure 15:
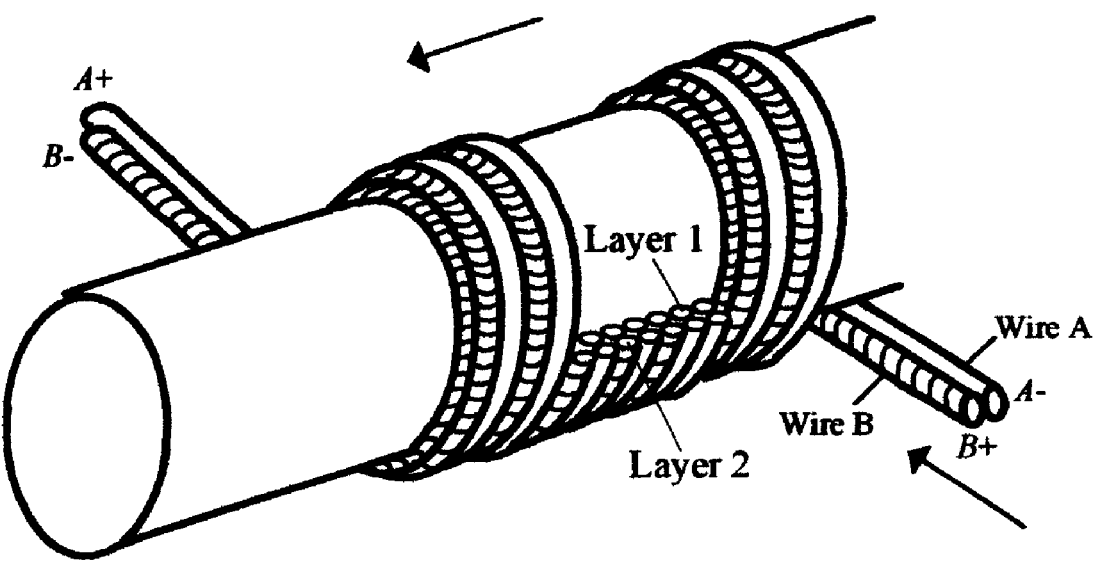
FIG. 15 is a graphical illustration of a cross-section of a double wire multi-layer same-directional winding.

In the preferred embodiment, double wire winding is used for the inductive winding. In the conventional art, wiring is done in opposite directions. The present disclosure conserves energy by wiring in a common direction. FIG. 14 and FIG. 15 illustrate double wire winding. The figures show how two wires are wrapped around the core in the same direction. As soon as the end of the core is reached, the wires are brought straight back to the starting position and wrapped in the same direction again. The wiring is done in multiple layers.

The two wires used to create a double wire winding are labeled Wire A and Wire B with the associated − or + sign to indicate the direction of current flow. In the figures to follow, the labels "A+, A−, B+, and B−" will be used to illustrate how the double wire winding is connected to the incoming power line and the capacitor. The negative (−) end of Wire B (B−) should be connected to the first incoming power line node and the negative (−) end of Wire A (A−) should be connected to the second incoming power line node. The positive (+) ends of Wire A (A+) and Wire B (B+) should be connected to the capacitor.

Figure 16:
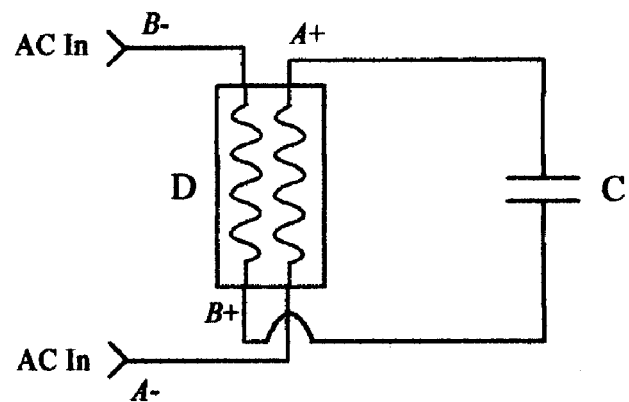
FIG. 16 is a circuit diagram of an illustrative double wire winding circuit.
Figure 17:
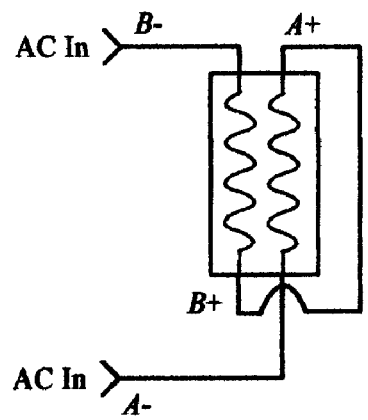
FIG. 17 is a circuit diagram of an illustrative double wire winding circuit.
Figure 18:
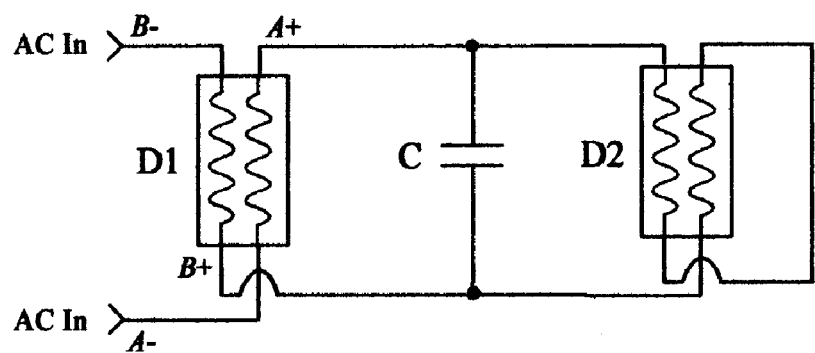
FIG. 18 is a circuit diagram of an illustrative double wire winding circuit.
Figure 19:
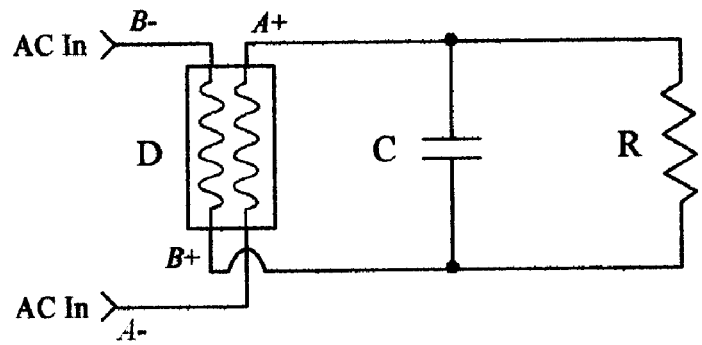
FIG. 19 is a circuit diagram of an illustrative double wire winding circuit.
Figure 20:
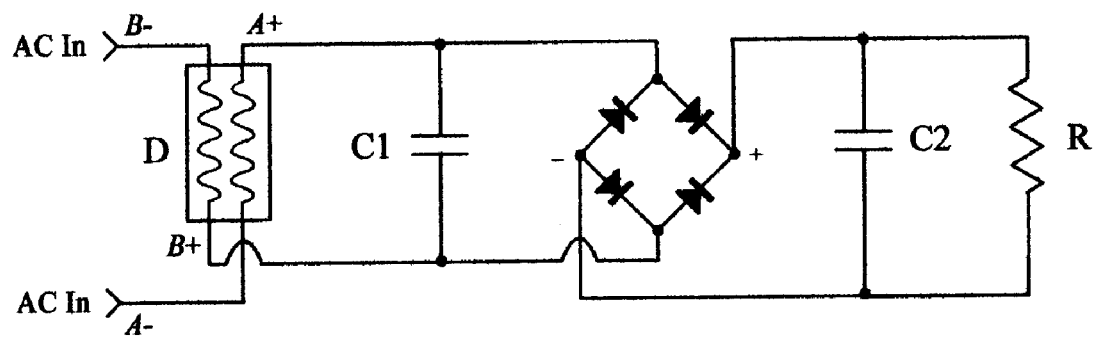
FIG. 20 is a circuit diagram of an illustrative double wire winding circuit.
Figure 21:
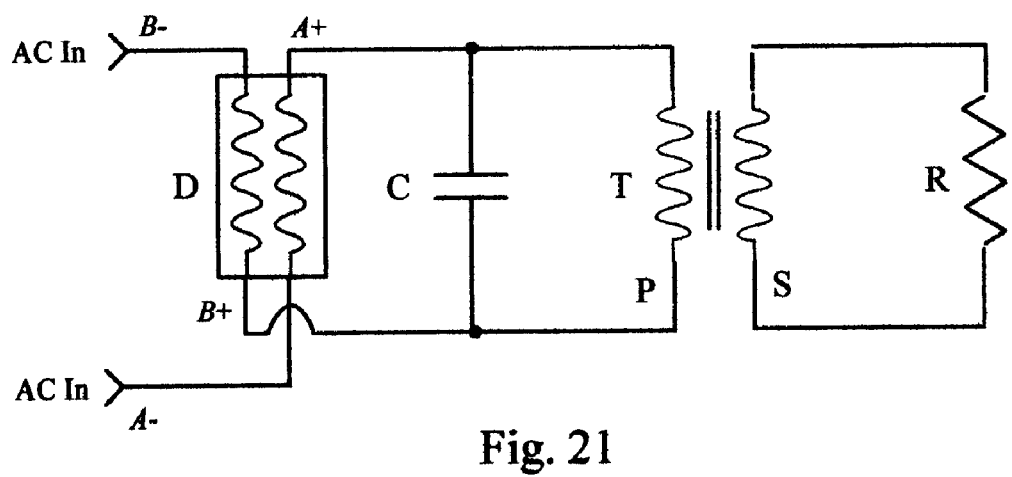
FIG. 21 is a circuit diagram of an illustrative double wire winding circuit.
Figure 22:
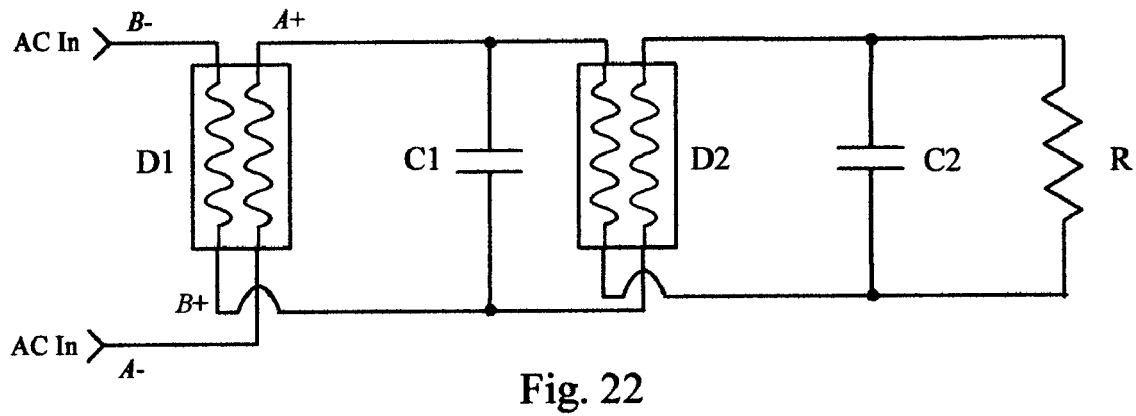
FIG. 22 is a circuit diagram of an illustrative double wire winding circuit.
Figure 23:
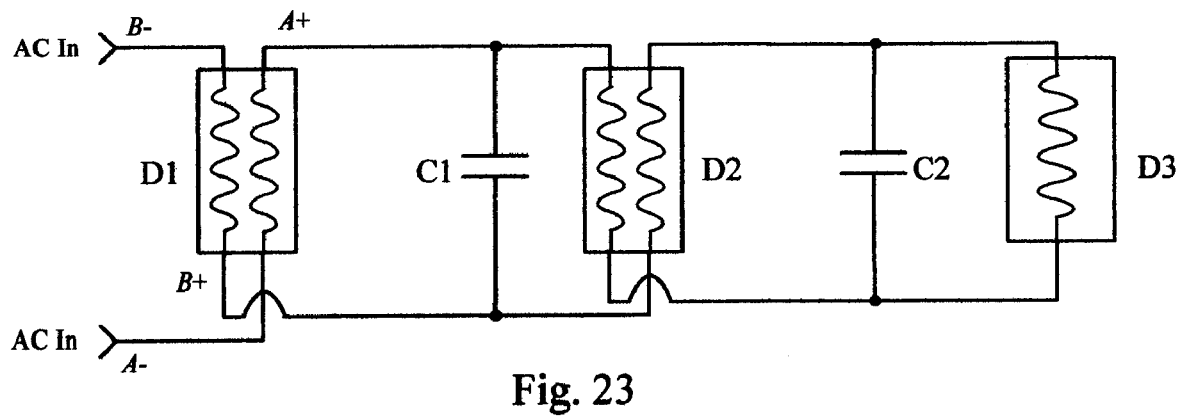
FIG. 23 is a circuit diagram of an illustrative double wire winding circuit.
Figure 24:
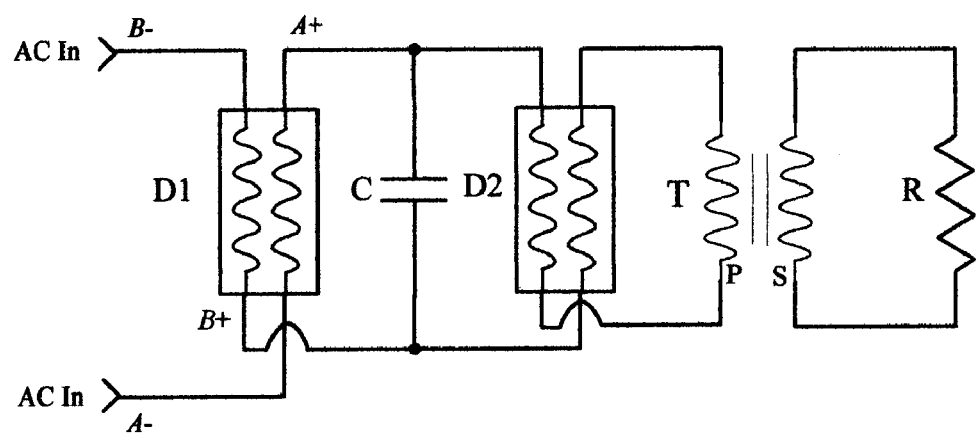
FIG. 24 is a circuit diagram of an illustrative double wire winding circuit.

FIGS. 16 through 32 illustrate circuits using double wire windings. FIG. 16 shows the incoming AC or inverting pulsating power connected to a double wire winding (D) coupled to a capacitor (C). FIG. 17 shows the double wire winding coupled in series. FIG. 18 shows a double wire winding (D1) coupled in parallel to capacitor (C) and the capacitor (C) coupled in parallel to another double wire winding (D2). FIG. 19 shows the double wire winding (D) coupled in parallel to the capacitor (C) and the capacitor (C) coupled in parallel to resistive load (R). FIG. 20 shows double wire winding (D) coupled in parallel to a capacitor (C1), capacitor (C1) coupled in parallel with a full-wave rectifier, which converts alternating current (AC) to direct current (DC), the full-wave rectifier coupled in parallel with capacitor (C2) or battery, and capacitor (C2) coupled in parallel with a resistive load (R). FIG. 21 shows the double wire winding (D) coupled in parallel to the capacitor (C), the capacitor (C) coupled in parallel to the primary transformer and the secondary transformer output coupled in parallel to a resistive load (R). FIG. 22 shows double wire winding (D1) coupled in parallel to capacitor (C1), capacitor (C1) coupled in parallel to double wire winding (D2), double wire winding (D2) coupled in parallel to capacitor (C2) and capacitor (C2) coupled in parallel to (R) resistive load. FIG. 23 shows a double wire winding (D1) coupled in parallel to capacitor (C1), capacitor (C1) coupled in parallel to double wire winding (D2), double wire winding (D2) coupled in parallel to capacitor (C2), and capacitor (C2) is coupled in parallel to single wire winding (D3). FIG. 24 shows double wire winding (D1) coupled in parallel to capacitor (C), capacitor (C) coupled in parallel to double wire winding (D2), double wire winding (D2) coupled in parallel to the primary transformer and the secondary transformer output coupled in parallel to a resistive load (R).

Figure 25:
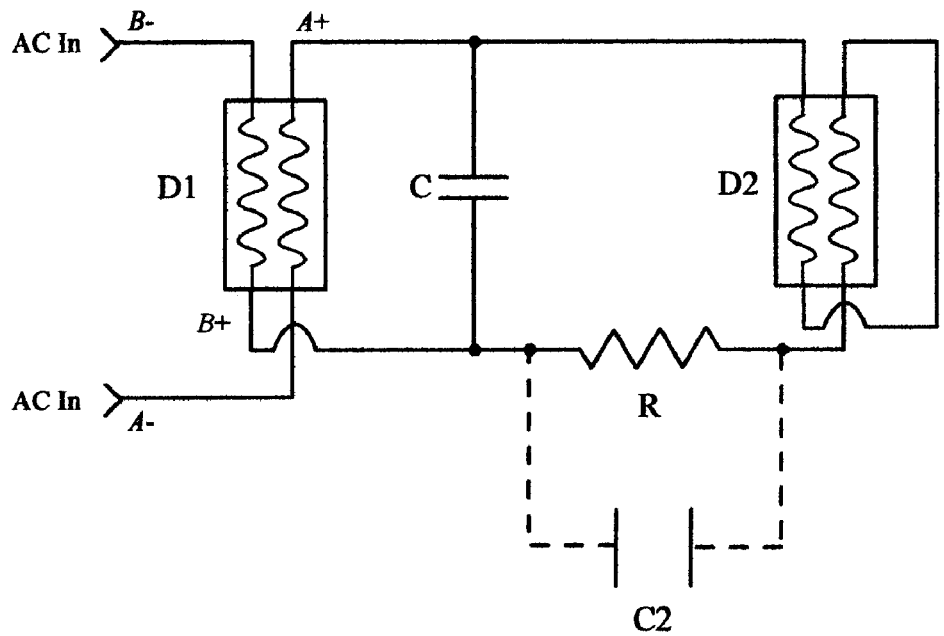
FIG. 25 is a circuit diagram of an illustrative double wire winding circuit.
Figure 26:
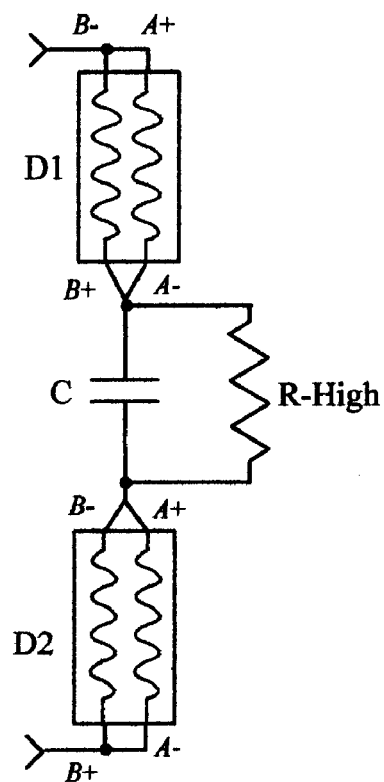
FIG. 26 is a circuit diagram of an illustrative double wire winding circuit.
Figure 27:
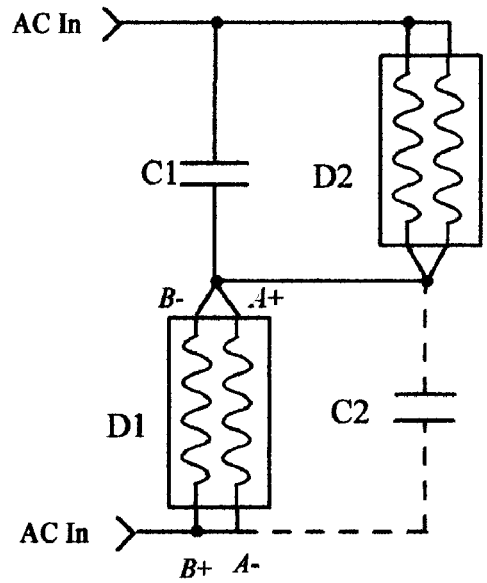
FIG. 27 is a circuit diagram of an illustrative double wire winding circuit.
Figure 28:
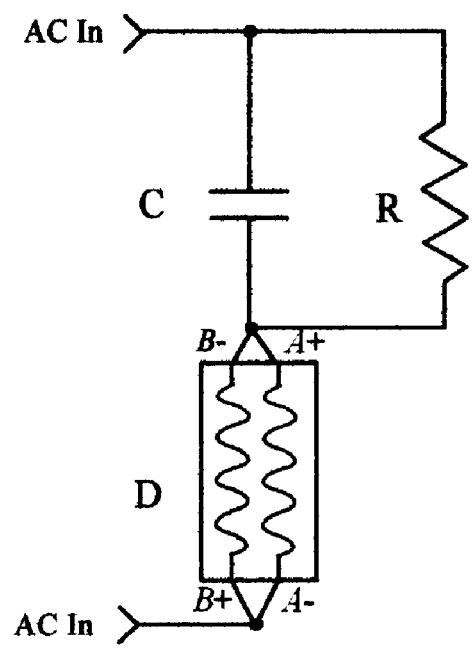
FIG. 28 is a circuit diagram of an illustrative double wire winding circuit.

FIG. 25 shows double wire winding (D1) coupled in parallel to the capacitor (C), capacitor (C) coupled in series with resistive load (R) or capacitor (C2) and this combination coupled in parallel to double wire winding (D2). FIG. 26 shows double wire winding (D1) and double wire winding (D2) each parallel wired together. Double wire winding (D1) is coupled in series to the capacitor (C), capacitor (C) is coupled in series to double wire winding (D2), and capacitor (C) is coupled in parallel to a high resistive resistor (R), which is added to release current when the incoming power stops. FIG. 27 shows double wire winding (D1) and double wire winding (D2) each parallel wired together. Double wire winding (D1) is coupled in series to capacitor (C1) and capacitor (C1) is coupled in parallel to double wire winding (D2). Double wire winding (D1) may also be coupled in parallel with capacitor (C2). FIG. 28 shows double wire winding (D) parallel wired together and coupled in series to capacitor (C). Capacitor (C) is coupled in parallel to resistive load (R).

Figure 29A:
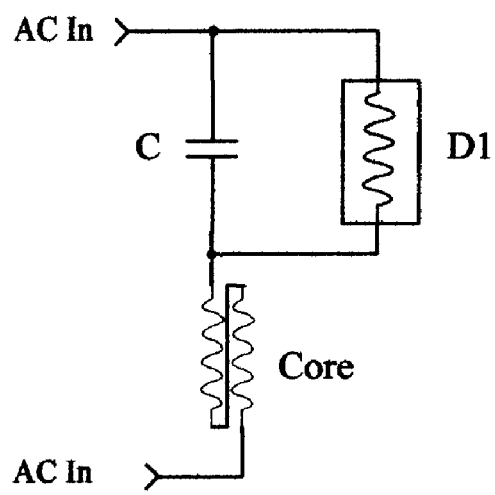
FIG. 29A is a circuit diagram of an illustrative double wire winding circuit with core.
Figure 29B:
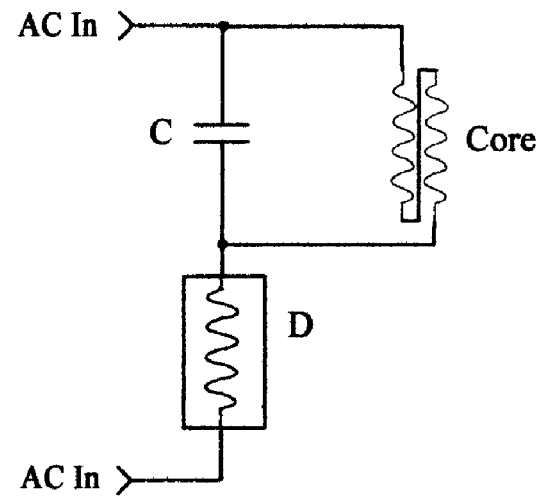
FIG. 29B is a circuit diagram of an illustrative double wire winding circuit with core.
Figure 30:
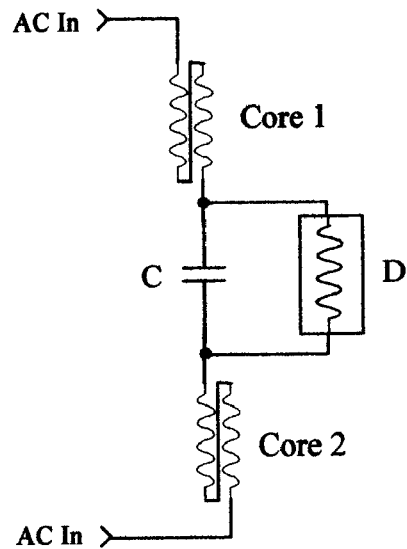
FIG. 30 is a circuit diagram of an illustrative double wire winding circuit with two cores.

FIG. 29A shows a double wire winding core that is either series or parallel connected to itself, coupled in series with the capacitor (C), and capacitor (C) coupled in parallel to winding (D). FIG. 29B shows a winding (D) coupled in series to the capacitor (C) and capacitor (C) coupled in parallel to a double wire winding core that is either series or parallel connected to itself. FIG. 30 shows two double wire winding cores either series or parallel connected to itself with a capacitor (C) coupled in between in series and capacitor (c) coupled in parallel to singe wire winding (D).

Figure 31:
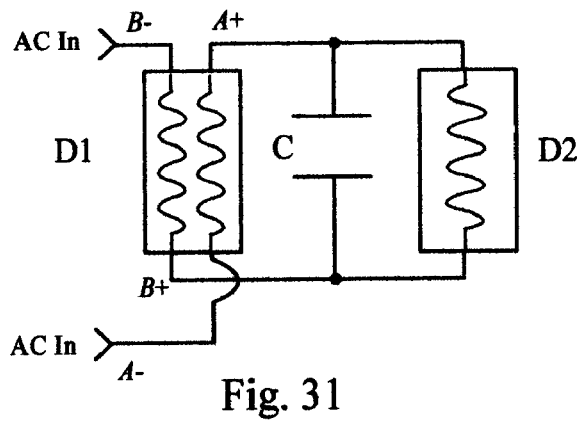
FIG. 31 is a circuit diagram of an illustrative double wire winding circuit.
Figure 32:
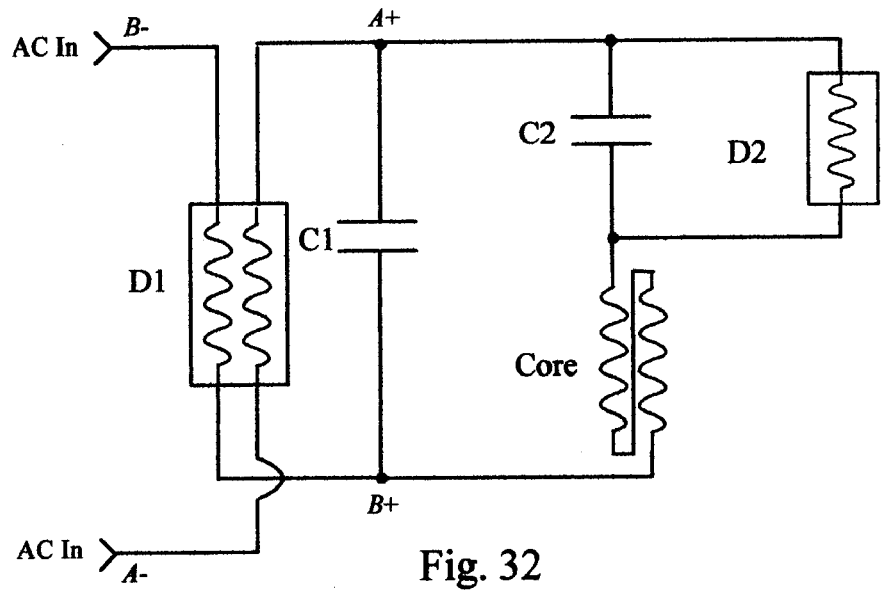
FIG. 32 is a circuit diagram of an illustrative double wire winding circuit, core, and single wire winding.

FIG. 31 shows double wire winding (D1) coupled in parallel to capacitor (C1) and capacitor (C1) coupled in parallel to single wire winding (D2). FIG. 32 shows double wire winding (D1) coupled in parallel to capacitor (C1), capacitor (C1) coupled in series to capacitor (C2) and double wire winding core (Core), and this combination coupled in parallel to single wire winding (D2).

Steel-Laminated Core

Figure 33:
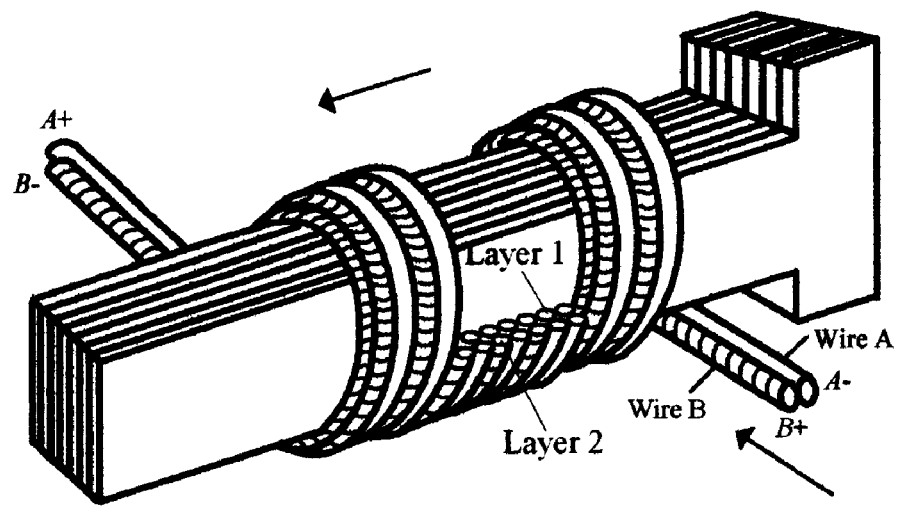
FIG. 33 is a graphical illustration of a multi-layer same-directional double wire winding core.
Figure 33:
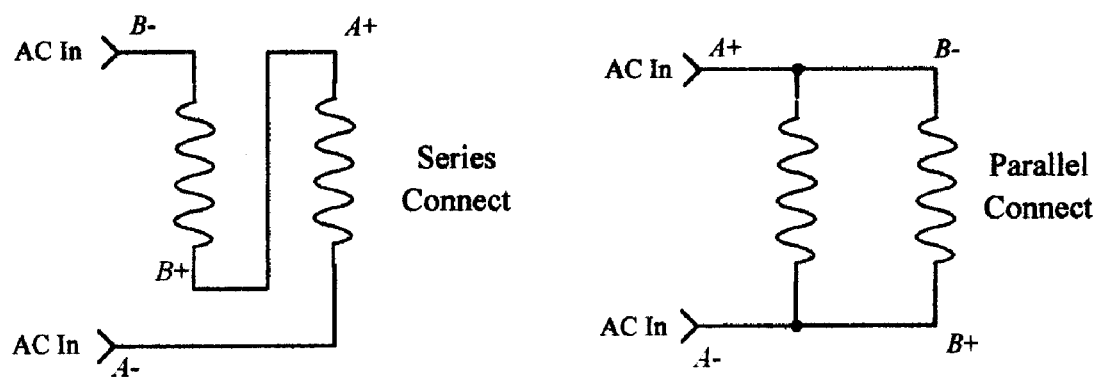

FIG. 33 depicts a steel-laminated core with double wire winding in multiple layers in a common direction. The two wires used to create a double wire winding are labeled Wire A and Wire B with the associated − or + sign to indicate the direction of current flow. The circuit diagrams in FIG. 33 illustrate how the double wire winding should be connected to the incoming power line when a core is used. If the wires are connected in series, the negative (−) end of Wire B (B−) is connected to the first incoming power line node, the positive (+) end of Wire B (B+) is connected to the positive (+) end of Wire A (A+), and the negative (−) end of Wire A is connected to the second incoming power line node. If the wires are connected in parallel, the positive (+) end of Wire A (A+) and the negative (−) end of Wire B (B−) is connected to the first incoming power line node and the negative (−) end of Wire A (A−) and the positive (+) end of Wire B (B+) is connected to the second incoming power line node.

The core, as used in the circuits described above, is not used as an inductor. The core increases power to the other inductor/motor/generator (D) shown in the drawings.

Motor/Generator Examples

Any of the motors described below can be used as the inductive windings shown in the previous circuit drawings. These are illustrative examples and one skilled in the art will recognize that modifications to the motors can be made, depending on the power output desired.

One skilled in the art will also recognize that any of the motors discussed herein may be converted into a generator, which converts mechanical motion into electrical energy, if torque is applied to the rotor and the device is driven above synchronous speed. The present disclosure is meant to encompass the use of a generator as well.

Shaded Motor

Figure 34:
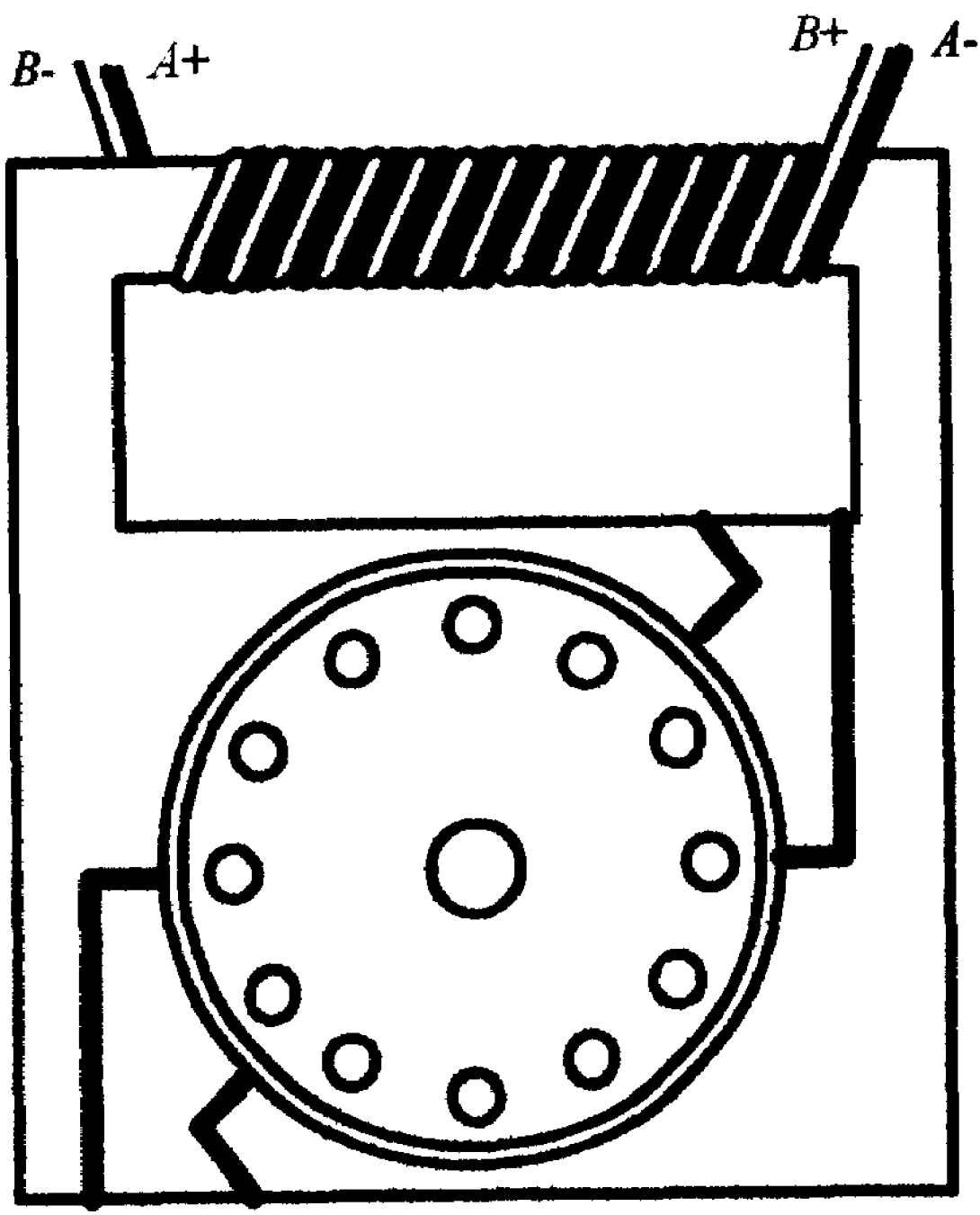
FIG. 34 is a graphical illustration of double wire winding for a shaded motor.

FIG. 34 illustrates a shaded motor with double wire winding in multiple layers in one direction. The motor can be connected in series or parallel to drive itself or connect to any of the above circuit drawings.

Stator Motor

Figure 35:
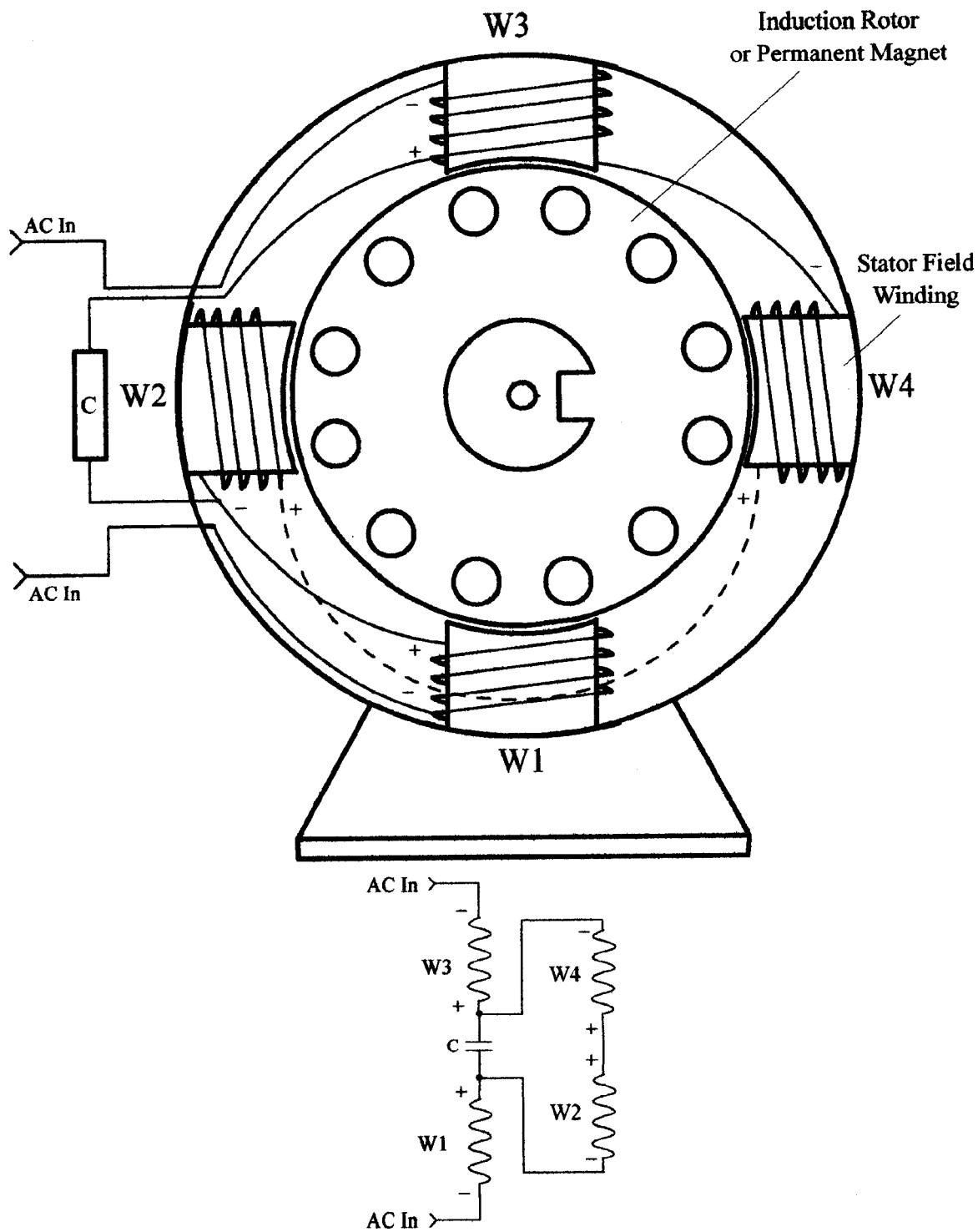
FIG. 35 is a cross-section depicting the winding for a stator motor.

FIG. 35 illustrates four winding groups (W1, W2, W3, and W4), each wrapped around a post in the stator motor. Winding Groups 1 (W1) and 3 (W3) are connected to the capacitor (C) in series. Winding Group 2 (W2) and Winding Group 4 (W4) are connected in series, with the positive ends of W2 and W4 connected together. The negative ends of this combination are connected in parallel to the capacitor.

For any phase, if the wiring is reversed, the motor will turn in the opposite direction, counter-clockwise. For example, if Winding Group 2 (W2) and Winding Group 4 (W4) are connected in series, with their negative ends connected together, and the positive ends of this combination are connected in parallel with the capacitor, the motor will rotate counter-clockwise.

Single Phase Wiring

For single-phase wiring, there are four major winding groups (W1, W2, W3, and W4). Each winding group has sub-groups and one skilled in the art will appreciate that the actual number of sub-groups may be varied depending upon the motor's physical size, horsepower and rotational speed. Each sub-group has a few hundred to thousands of turns of winding wire.

Figure 36:
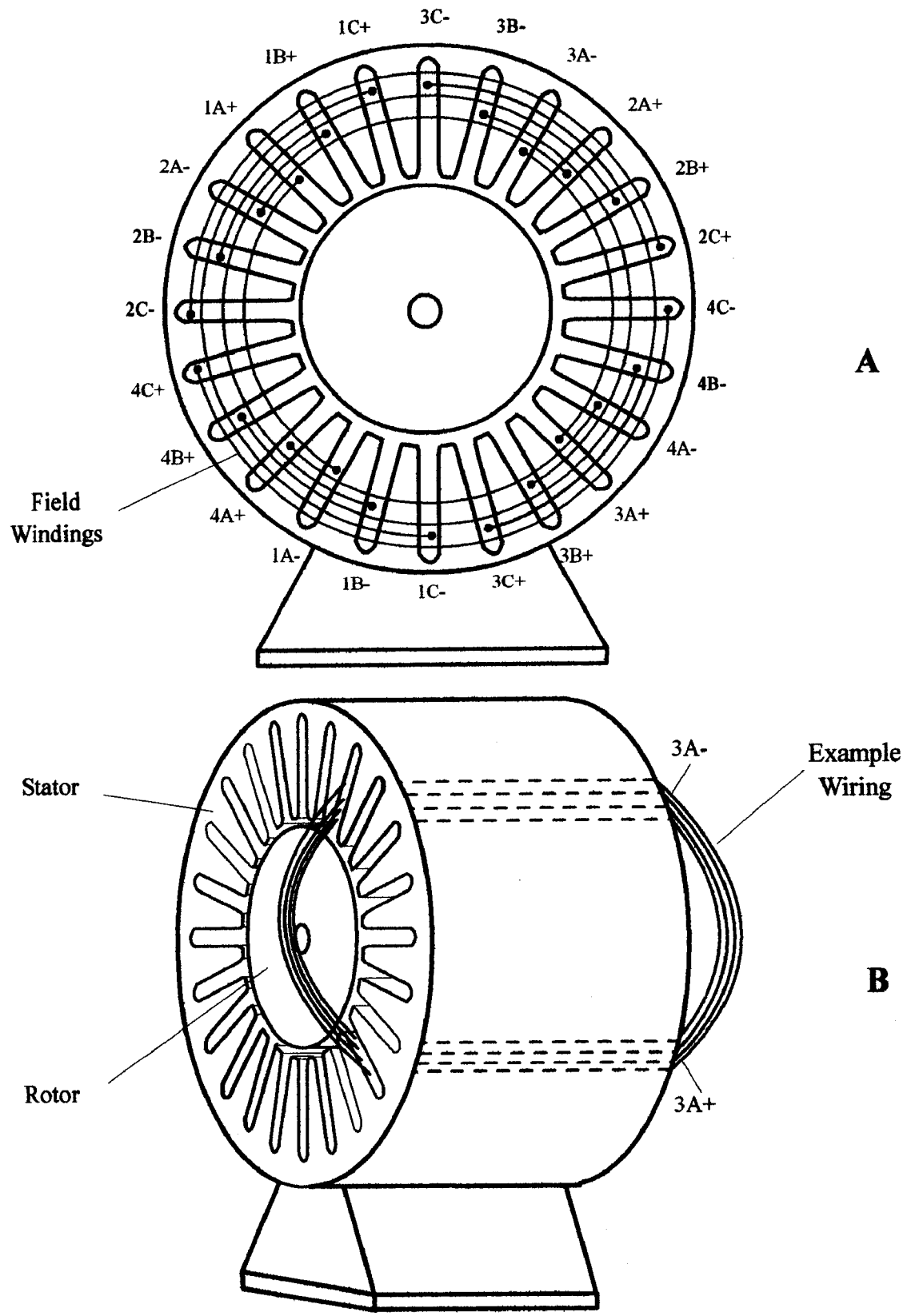
FIG. 36 is graphical illustration of wiring for a squirrel cage motor.

FIG. 36A and FIG. 36B are diagrams of single-phase wiring in a squirrel cage motor or permanent magnet rotor, illustrating how the coils for each sub-group are wrapped around the teeth or slot. Each winding group has three sub-groups (1A, 1B, 1C, 2A, 2B, 2C, 3A, 3B, 3C, 4A, 4B, 4C). FIG. 36A is a diagram of the cross section for wiring. FIG. 36B shows the side view of wiring for one group. Although a squirrel cage motor is depicted, this is merely one example of the type of motors that may be used. For example, a motor with permanent magnets may also be used.

Figure 37:
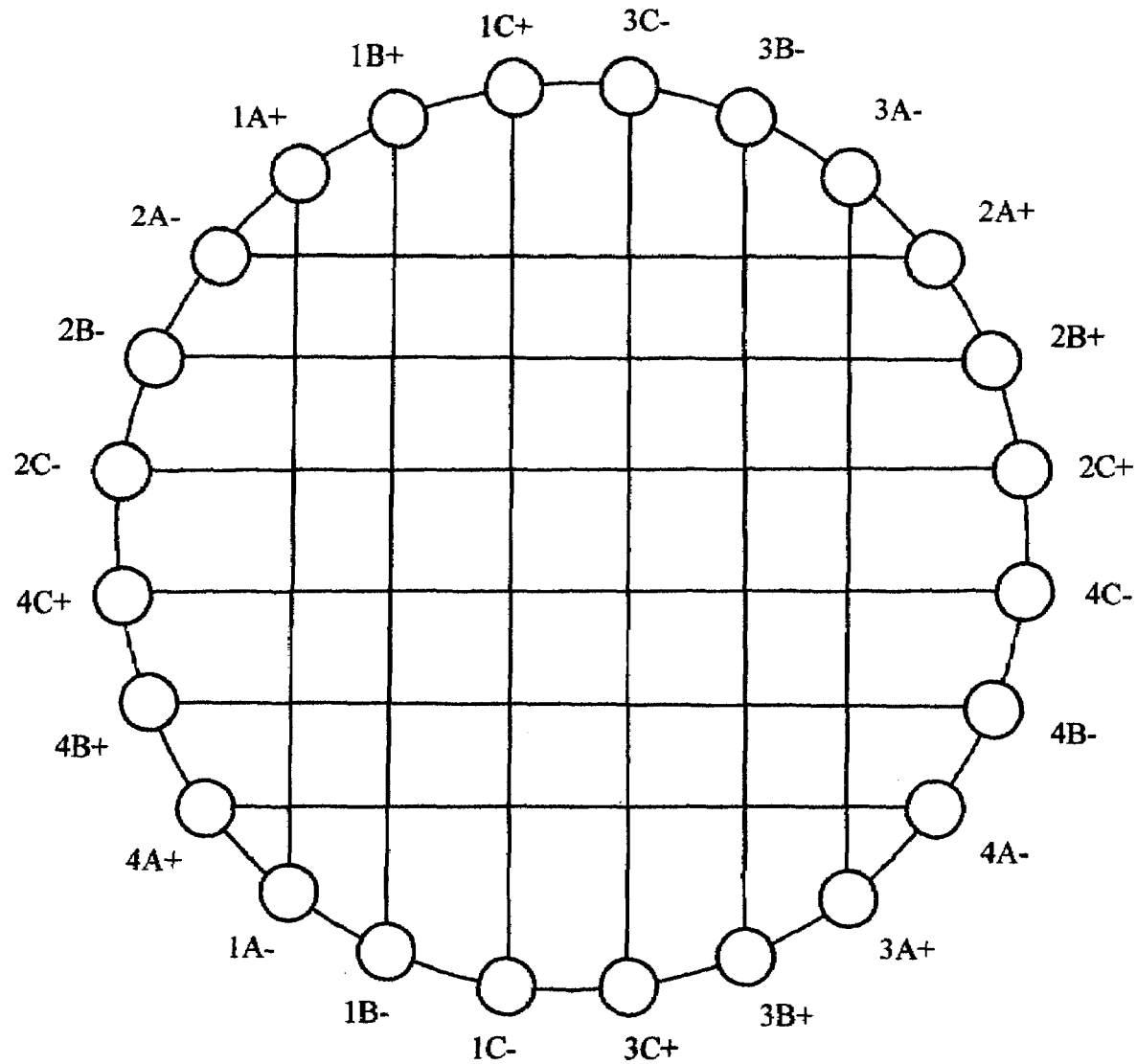
FIG. 37 is a cross-section depicting the wiring for a single-phase squirrel motor.

FIG. 37 is a schematic for the cross-section of the wiring for a single-phase motor. There are twenty four (24 slots) shown for twelve sub-groups. For each sub-group, the wire is wound in each stator slot and wire is wound in the same direction from negative to positive out. One skilled in the art will appreciate that the actual number of stator slots may be varied depending upon the motor's physical size, horsepower and rotational speed.

Figure 38:
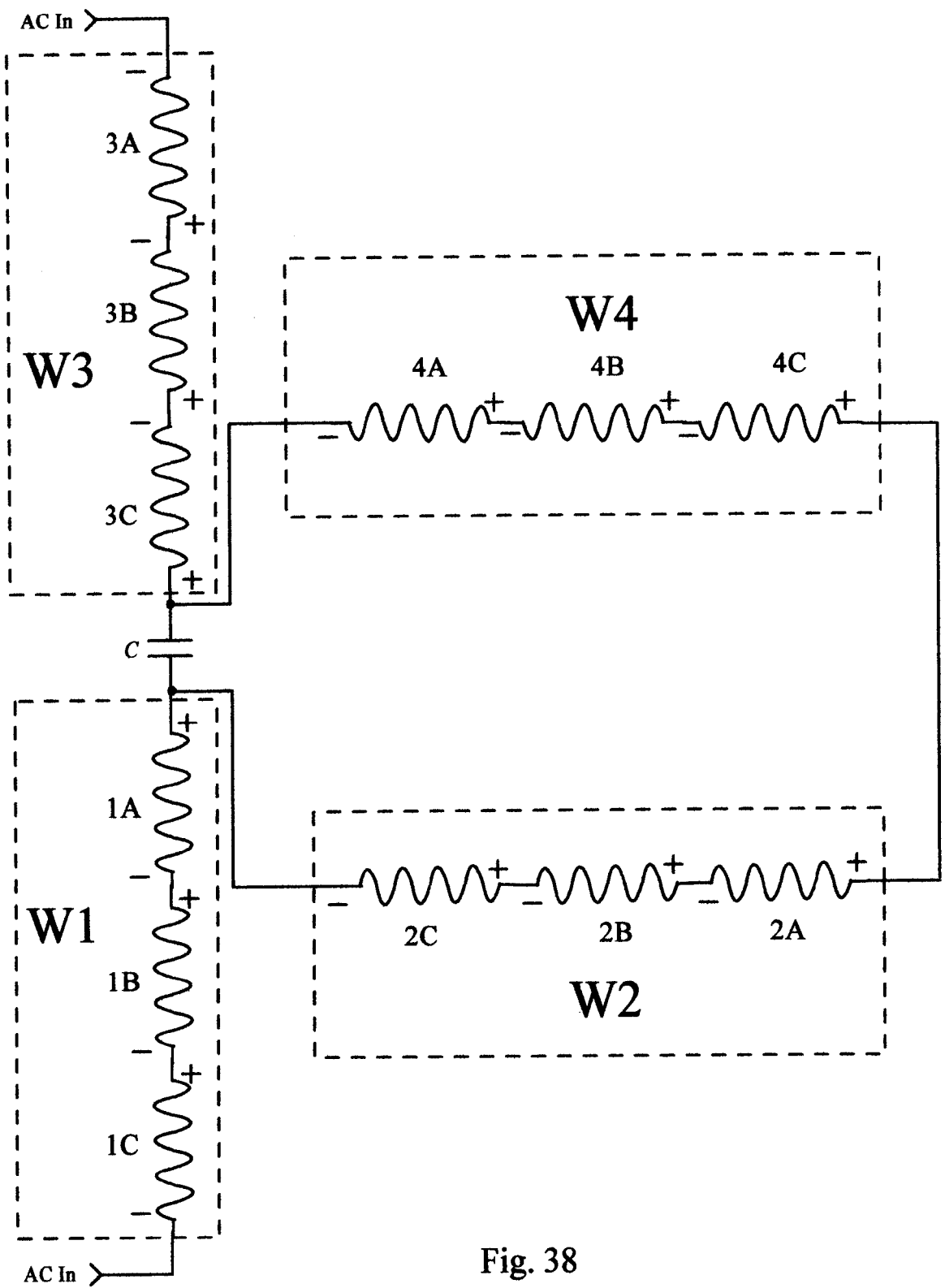
FIG. 38 is a schematic diagram of the wiring in series for the single-phase squirrel cage motor.

FIG. 38 illustrates one embodiment of the present disclosure for single-phase motors with the sub-groups connected in series. FIG. 38 shows sub-groups 1A, 1B, and 1C connected in series, with the negative end of 1A connected to the positive end of 1B and the negative end of 1B connected to the positive end of 1C. Sub-groups 3A, 3B, and 3C are also connected in series, with the positive end of 3A connected to the negative end of 3B and the positive end of 3B connected to the negative end of 3C. The negative end of W3 is connected to the first power line node and the positive end of W3 is connected in series to the capacitor (C). The capacitor (C) is also series connected to the positive end of W1 and the negative end of W1 is connected to the second power line node. Sub-groups 4A, 4B, and 4C are connected in series, with the positive end of 4A connected to the negative end of 4B and the positive end of 4B is connected to the negative end of 4C. Sub-groups 2A, 2B, and 2C are also connected in series, with the negative end of 2A connected to the positive end of 2B and the negative end of 2B connected to the positive end of 2C. The positive end of W2 and W4 are connected in series. This combination is connected in parallel to the capacitor (C), with the negative ends of W2 and W4 connected to the capacitor.

Figure 39:
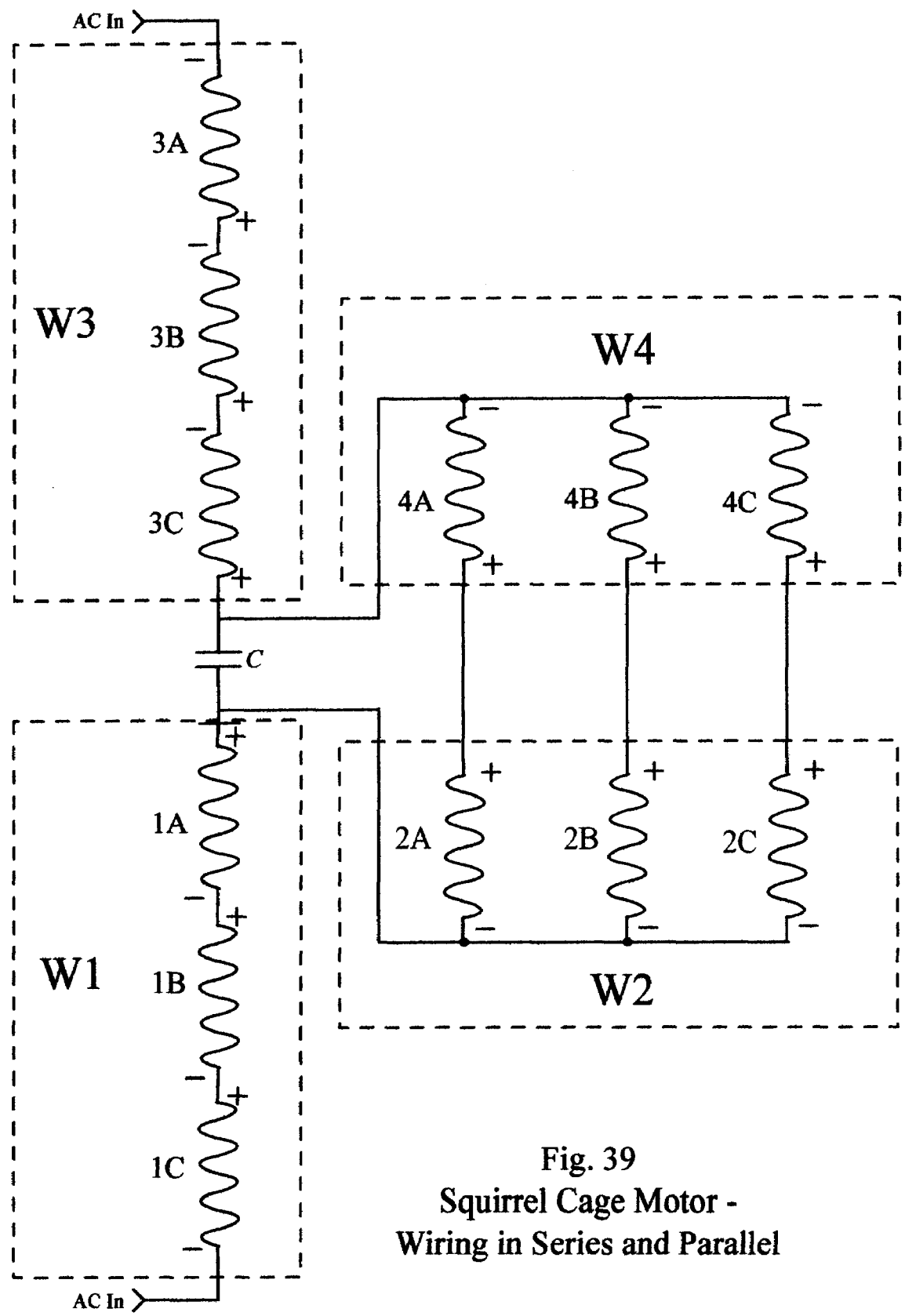
FIG. 39 is a schematic diagram of the wiring in series and parallel for the single-phase squirrel cage motor.

FIG. 39 illustrates another embodiment of the present disclosure for single-phase motors, with the sub-groups for W1 and W3 connected in series and the sub-groups for W2 and W4 connected in parallel. FIG. 39 shows sub-groups 1A, 1B, and 1C connected in series, with the negative end of 1A connected to the positive end of 1B and the negative end of 1B connected to the positive end of 1C. Sub-groups 3A, 3B, and 3C are also connected in series, with the positive end of 3A connected to the negative end of 3B and the positive end of 3B connected to the negative end of 3C. The negative end of W3 is connected to the first power line node and the positive end of W3 is connected in series to the capacitor (C). The capacitor (C) is also series connected to the positive end of W1 and the negative end of W1 is connected to the second power line node. Sub-groups 4A, 4B, and 4C are connected in series with sub-groups 2A, 2B, and 2C. The positive end of 2A is connected in series to the positive end of 4A, the positive end 2B is connected in series to the positive end of 4B, and the positive end of 2C is connected in series with the positive end of 4C. The negative ends of 2A, 2B, and 2C are connected together. The negative ends of 4A, 4B, and 4C are connected together. This combination is connected in parallel to the capacitor (C), with the negative ends of W2 and W4 connected to the capacitor (C).

Figure 40:
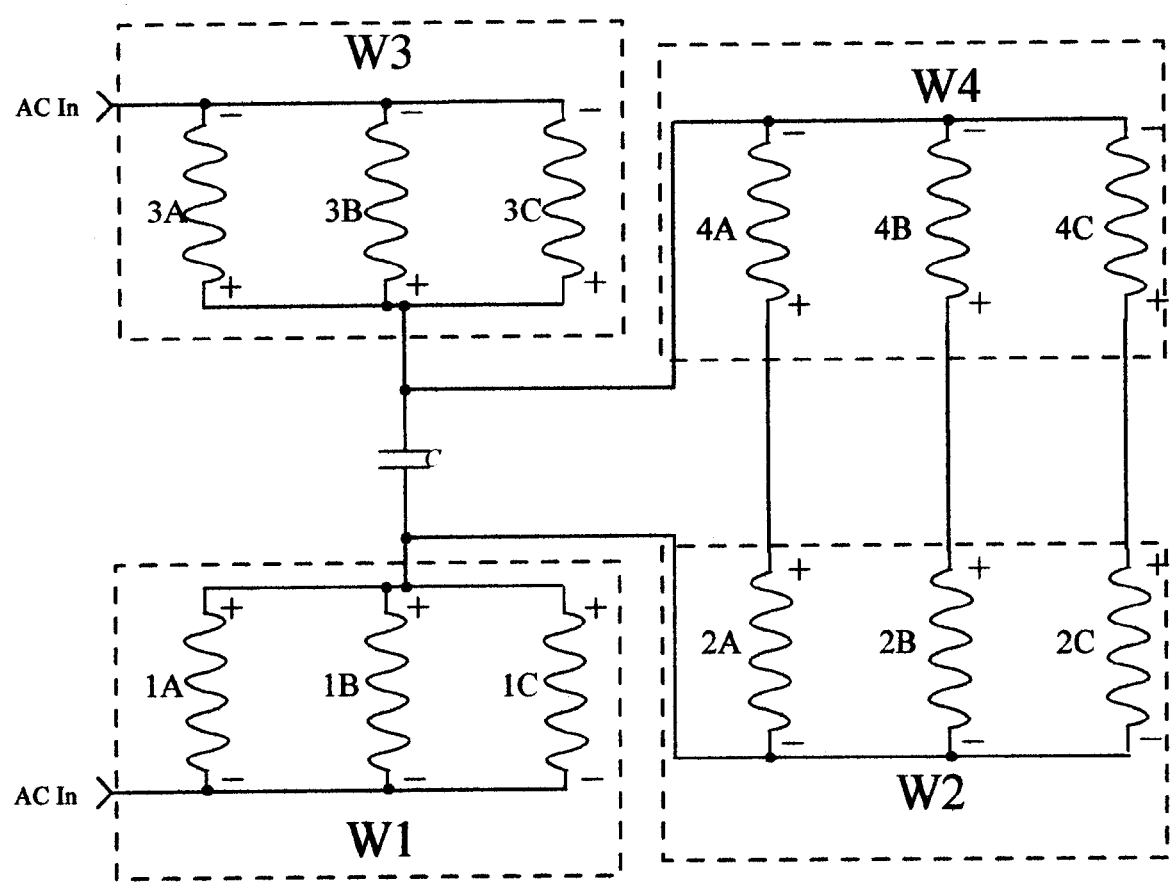
FIG. 40 is a schematic diagram of the wiring in parallel for the single-phase squirrel cage motor.

FIG. 40 illustrates yet another embodiment of the present disclosure for single-phase motors, with the sub-groups connected in parallel. FIG. 40 shows subgroup 1A, 1B, and 1C connected together in parallel, with the positive ends of 1A, 1B, and 1C connected together and the negative ends of 1A, 1B, and 1C connected together. Subgroups 3A, 3B, and 3C are also connected together in parallel, with the positive ends of 3A, 3B, and 3C connected together and the negative ends of 3A, 3B, and 3C connected together. The negative end of W3 is connected to the first power line node and the positive end of W3 is connected in series to the capacitor (C). The capacitor (C) is also series connected to the positive end of W1 and the negative end of W1 is connected to the second power line node. Sub-groups 4A, 4B, and 4C are connected in series with sub-groups 2A, 2B, and 2C. The positive end of 2A is connected in series to the positive end of 4A, the positive end 2B is connected in series to the positive end of 4B, and the positive end of 2C is connected in series with the positive end of 4C. The negative ends of 2A, 2B, and 2C are connected together. The negative ends of 4A, 4B, and 4C are connected together. This combination is connected in parallel to the capacitor (C), with the negative ends of W2 and W4 connected to the capacitor (C).

Figure 41:
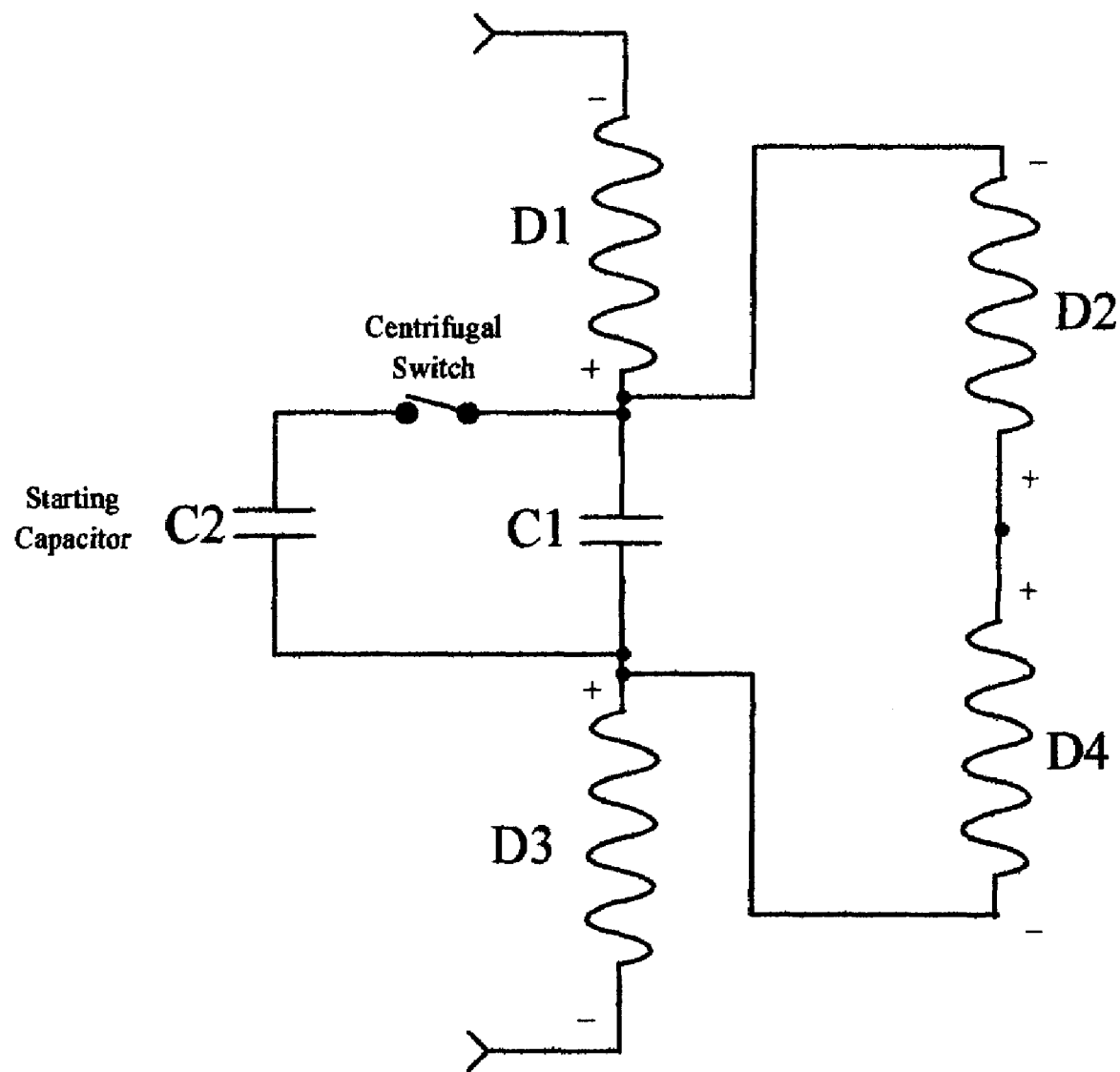
FIG. 41 is a schematic diagram of circuit with two capacitors and a centrifugal switch.

FIG. 41 shows how the circuit can be modified to provide more torque for staring the device, using two capacitors (C1 and C2), four inductive windings (D1, D2, D3, and D4), and a centrifugal switch. C2, the bigger capacitor, can be added in parallel to C1 and the centrifugal switch can control the starting time and turn of C2.

Multi-Phase Motor

FIGS. 42A through 42D, combined, illustrate the cross-section for the windings of a multi-phase motor or generator and the sequence in which the coils are energized in order to cause the permanent magnet attached to the rotor to rotate. The multi-phase motor or generator includes four phases, each 45 degrees apart: 0 degrees, 45 degrees, 90 degrees, and 135 degrees and there are four winding groups for each phase (W1, W2, W3, and W4).

For clarification purposes, each phase for the multiphase motor or generator is shown in a separate figure, although all four phases are located within the motor or generator. For each phase, there are four winding groups and two of the winding groups are formed from combining two subgroups. Each sub-group has a few hundred to thousands of turns of winding wire.

FIGS. 42A through 42D illustrate how the winding groups for each phase are wrapped around the teeth or slot. For each winding group, the wire is wound in each stator slot and wire is wound in the same direction from negative to positive out.

There are twenty four slots (S1 through S24); although one skilled in the art will appreciate that the actual number of stator slots may be varied depending upon the motor's physical size, horsepower and rotational speed.

Figure 42A:
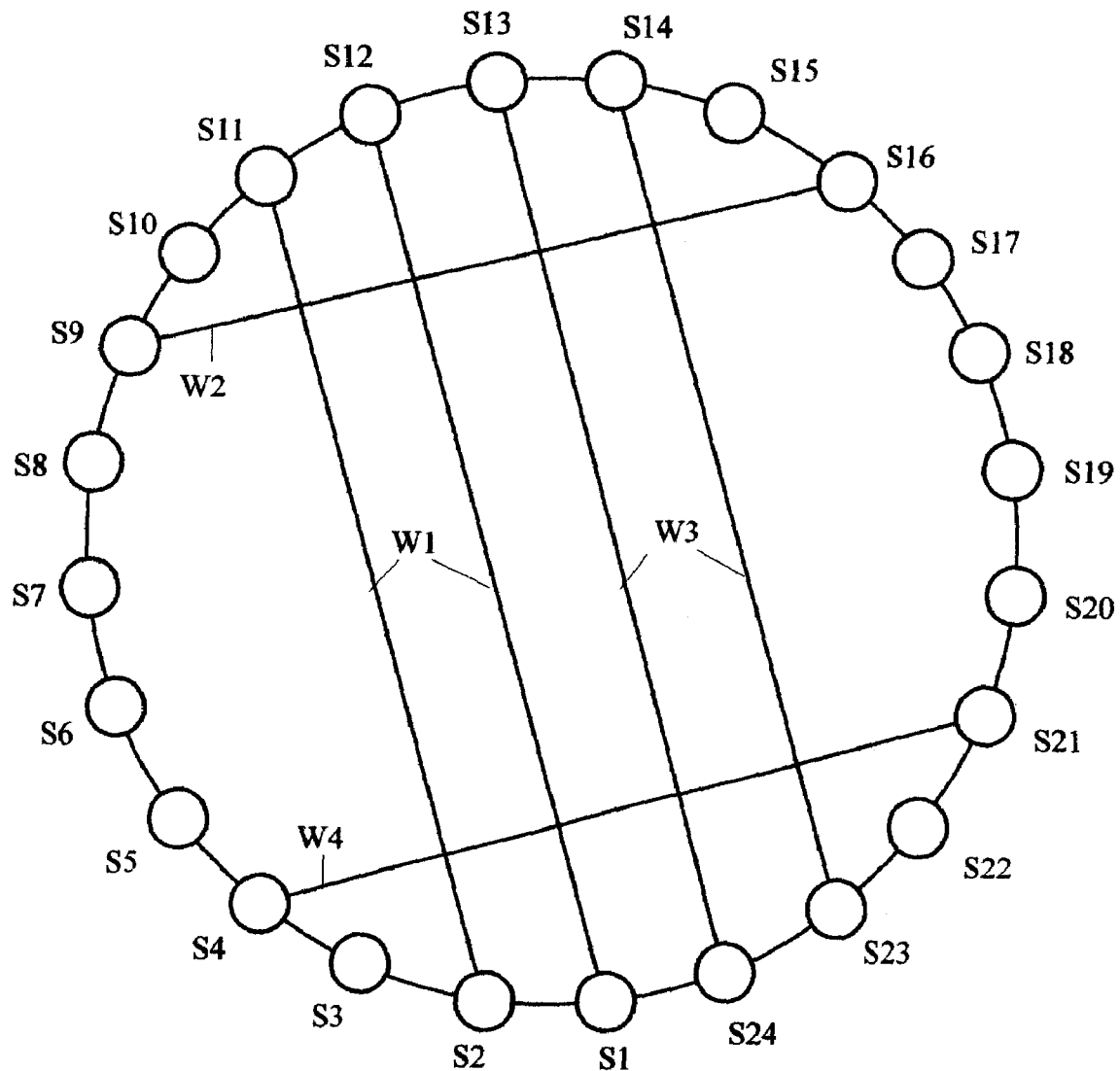
FIG. 42A is a cross-section of windings for Phase Group 0 Degrees in a multi-phase squirrel cage motor.

FIG. 42A illustrates the winding groups for Phase Group 0 degrees. W1 is formed by wrapping wire from slot S1 to S12, which forms the first sub-group, and from wire wrapped from slot S2 to slot S11, which forms the second sub-group. The two sub-groups are combined to form W1. W2 is formed by wrapping wire from slot S9 to slot S16. W3 is formed by wrapping wire from slot S13 to slot S24, which forms the first sub-group, and from wire wrapped from slot S14 to slot S23, which forms the second sub-group. The two sub-groups are combined to form W3. W4 is formed from wrapping wire from slot S4 to slot S21.

Figure 42B:
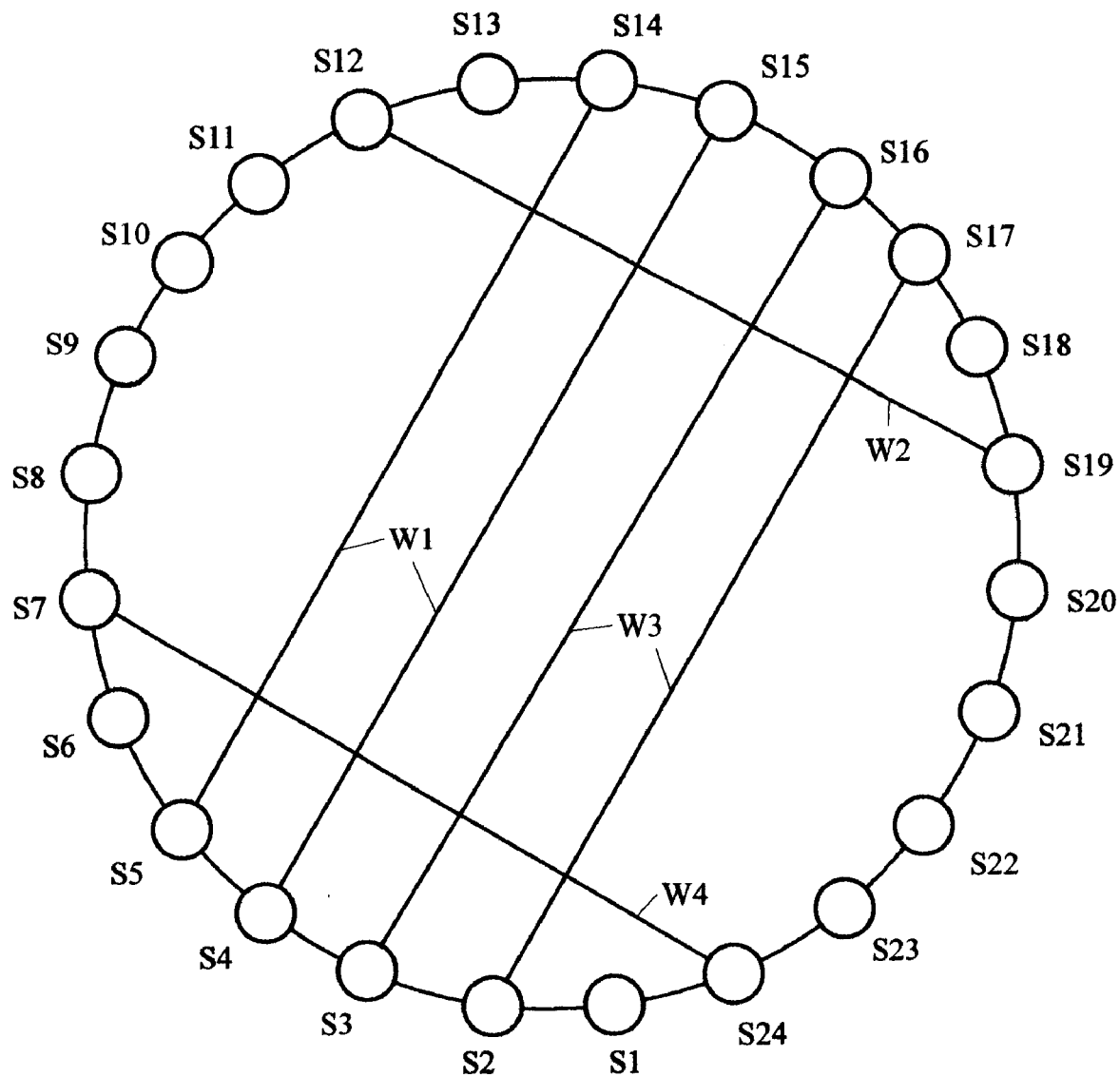
FIG. 42B is a cross-section of windings for Phase Group 45 Degrees in a multi-phase squirrel cage motor.

FIG. 42B shows the winding groups for Phase Group 45 degrees. W1 is formed by wrapping wire from slot S4 to S15, which forms the first sub-group, and from wire wrapped from slot S5 to slot S14, which forms the second sub-group. The two sub-groups are combined to form W1. W2 is formed by wrapping wire from slot S12 to slot S19. W3 is formed by wrapping wire from slot S2 to slot S17, which forms the first sub-group, and from wire wrapped from slot S3 to slot S16, which forms the second sub-group. The two sub-groups are combined to form W3. W4 is formed from wrapping wire from slot S7 to slot S24.

Figure 42C:
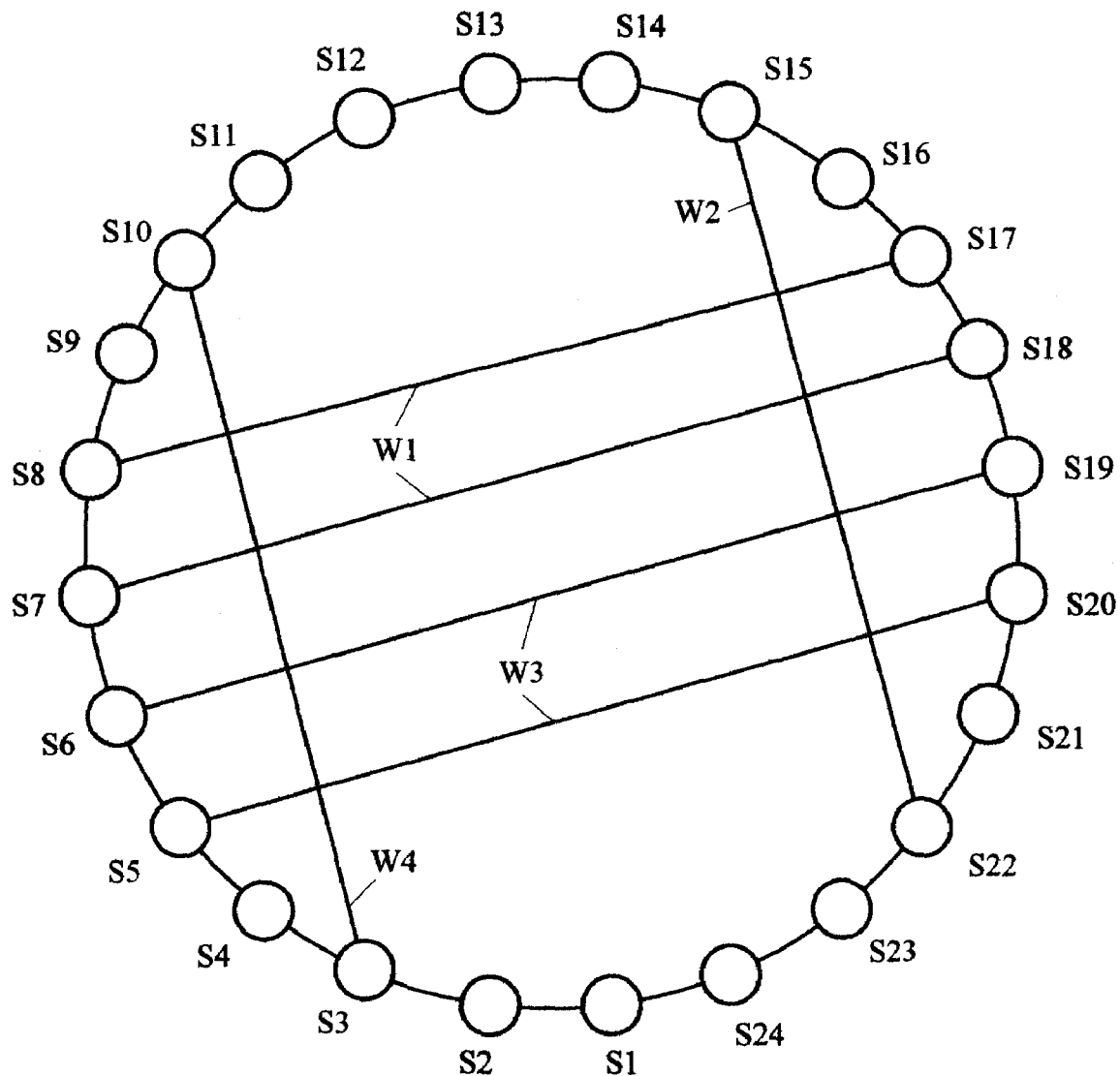
FIG. 42C is a cross-section of windings for Phase Group 90 Degrees in a multi-phase squirrel cage motor.

FIG. 42C shows the winding groups for Phase Group 90 degrees. W1 is formed by wrapping wire from slot S7 to S18, which forms the first sub-group, and from wire wrapped from slot S8 to slot S17, which forms the second sub-group. The two sub-groups are combined to form W1. W2 is formed by wrapping wire from slot S15 to slot S22. W3 is formed by wrapping wire from slot S5 to slot S20, which forms the first sub-group, and from wire wrapped from slot S6 to slot S19, which forms the second sub-group. The two sub-groups are combined to form W3. W4 is formed from wrapping wire from slot S3 to slot S10.

Figure 42D:
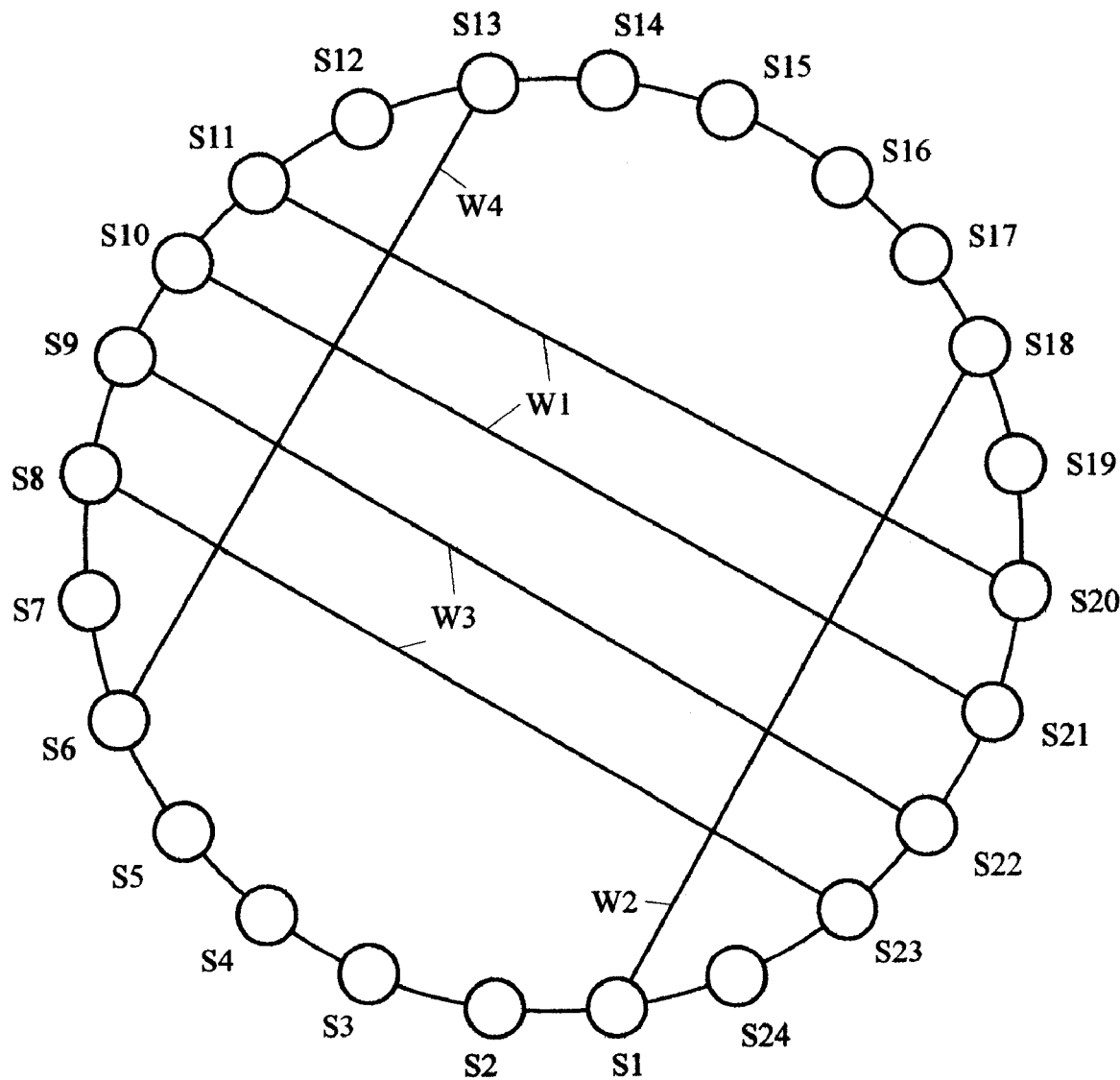
FIG. 42D is a cross-section of windings for Phase Group 135 Degrees in a multi-phase squirrel cage motor.

FIG. 42D shows the winding groups for Phase Group 135 degrees. W1 is formed by wrapping wire from slot S10 to S21, which forms the first sub-group, and from wire wrapped from slot S11 to slot S20, which forms the second sub-group. The two sub-groups are combined to form W1. W2 is formed by wrapping wire from slot S1 to slot S18. W3 is formed by wrapping wire from slot S8 to slot S23, which forms the first sub-group, and from wire wrapped from slot S9 to slot S22, which forms the second sub-group. The two sub-groups are combined to form W3. W4 is formed from wrapping wire from slot S6 to slot S13.

Figure 42E:
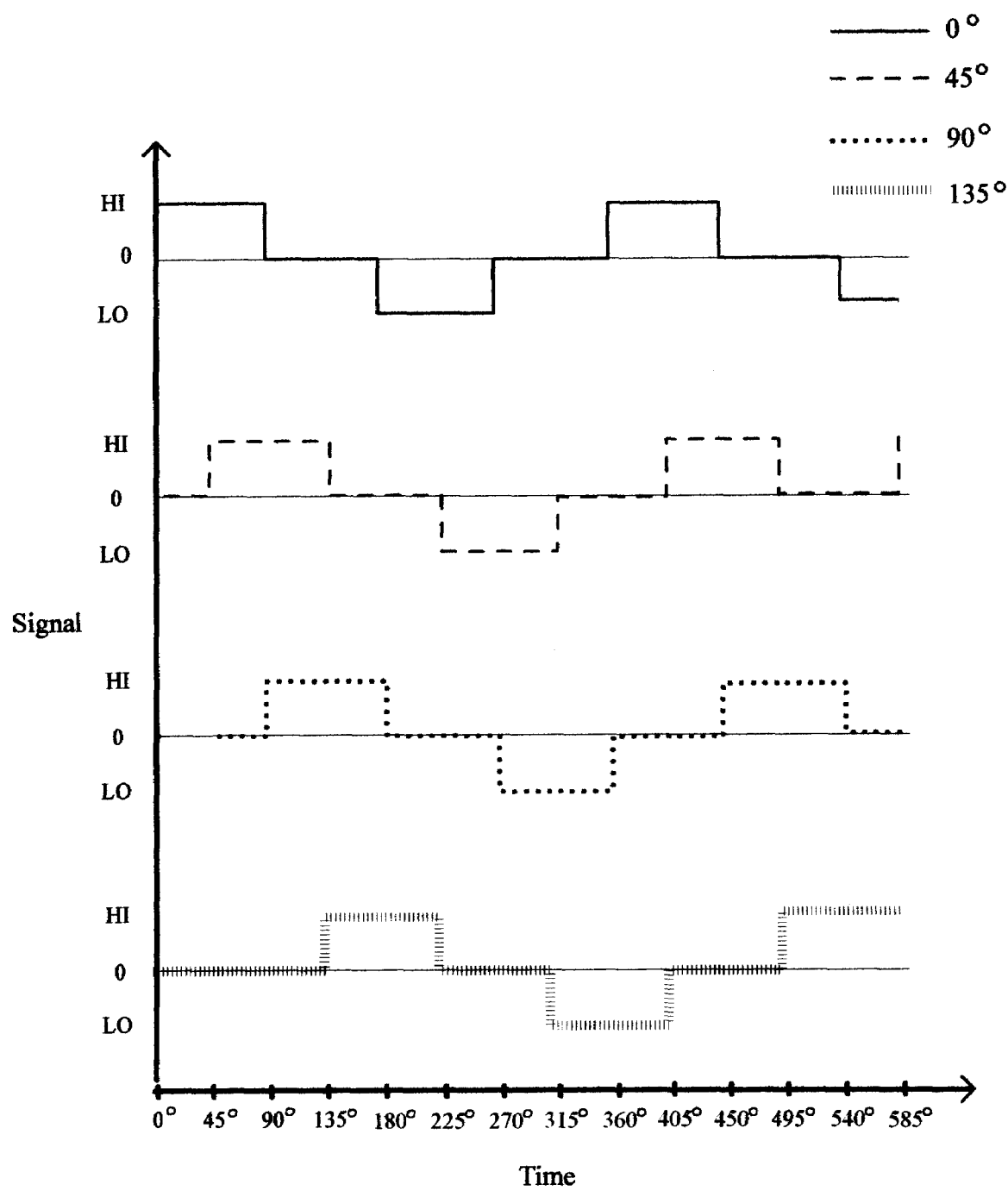
FIG. 42E is an illustrative plot of the four-phase clock timing waveform.

The timing waveform for each phase, represented by a different design pattern, is shown in FIG. 42E. For each phase, the current flows at 0 degrees (on time) and then stops at 90 degrees (off time), then current flows in the opposite direction at 180 degrees (on time) and then stops at 270 degrees (off time).

Connection of Motor to Capacitor

Figure 43:
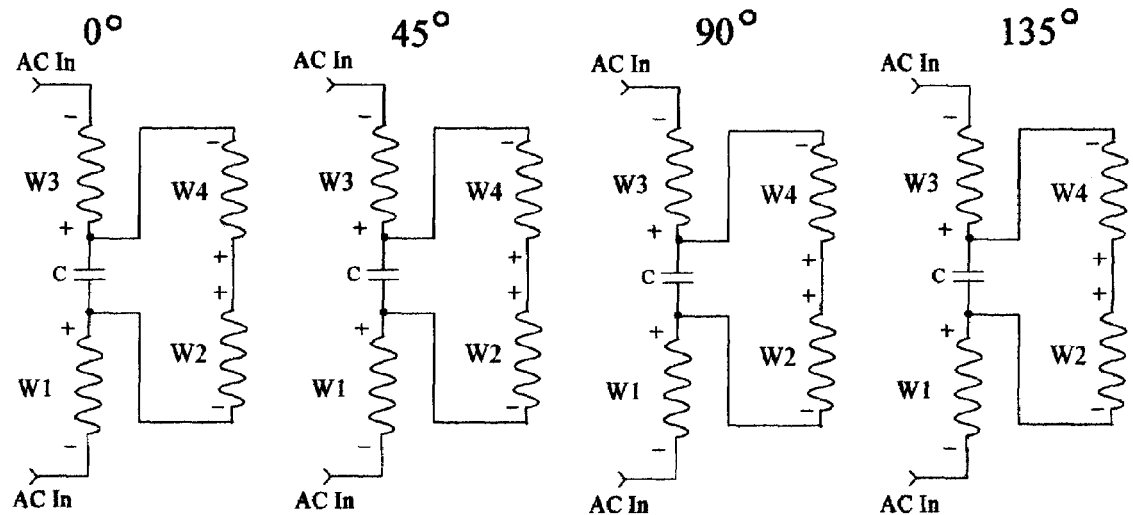
FIG. 43 is a schematic diagram of a 4-phase drive motor.

FIG. 43 is a schematic of a 4-phase drive motor. Each phase group of the multiphase wire windings, 0 degrees, 45 degrees, 90 degrees, and 135 degrees, connects to a capacitor (C). For each phase group, W1 and W3 are connected in series to the capacitor. W2 is connected in series to W4 and this combination is connected in parallel to the capacitor. The details of the wiring for a single-phase are discussed above.

Figure 44:
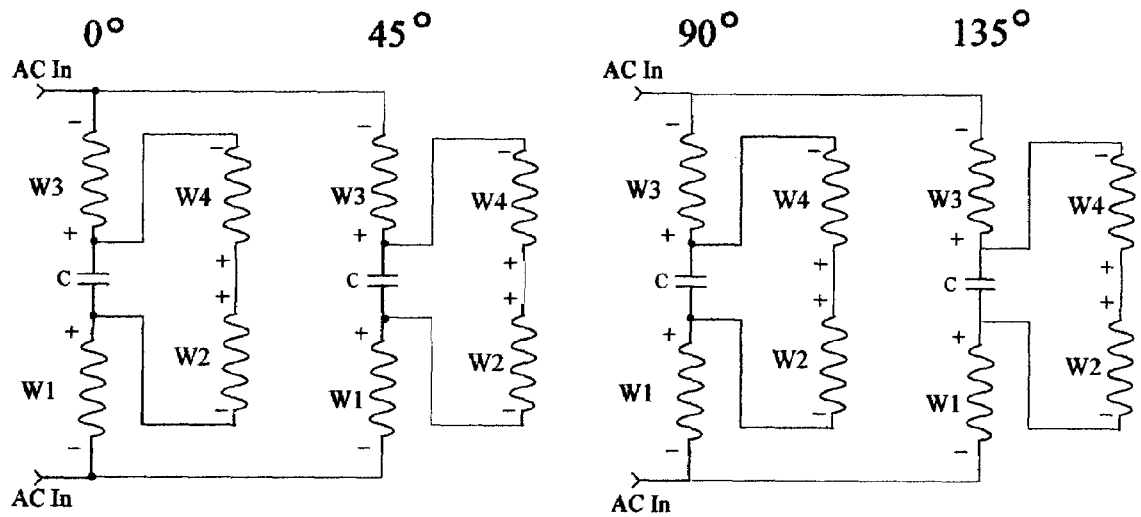
FIG. 44 is a schematic diagram of a 2-phase drive motor.

FIG. 44 illustrates how the four-phase drive motor can be converted into a two-phase motor or two-phase power output. Phase group 0 degrees and Phase group 45 degrees are combined and Phase group 90 degrees and Phase group 135 degrees are combined. The negative ends of W3 for Phase group 0 degrees and W3 for Phase group 45 degrees are connected together and this combination is then connected to the first incoming power line node. The negative ends of W1 for Phase group 0 degrees and W1 for Phase group 45 degrees are connected together and this combination is connected to the second incoming power line node. Likewise, the negative ends of W3 for Phase group 90 degrees and W3 for Phase group 135 degrees are connected together and this combination is then connected to the first incoming power line node. The negative ends of W1 for Phase group 90 degrees and W1 for Phase group 135 degrees are connected together and this combination is connected to the second incoming power line node.

Figure 45:
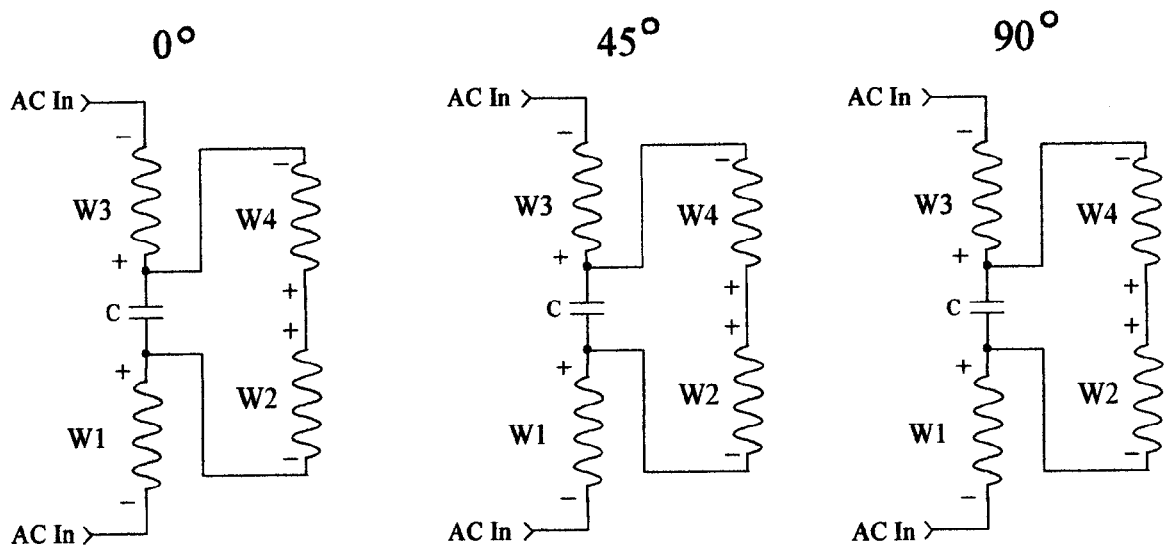
FIG. 45 is a schematic diagram of a 3-phase drive motor.

FIG. 45 is a schematic of a 3-phase drive motor. Each phase group, 0 degrees, 45 degrees, and 90 degrees, connects to a capacitor (c). For each phase group, W1 and W3 are connected in series to the capacitor. W2 is connected in series to W4 and this combination is connected in parallel to the capacitor. The details of the wiring for a single-phase are discussed above.

Light Bulb Energy Conservation

Figure 46:
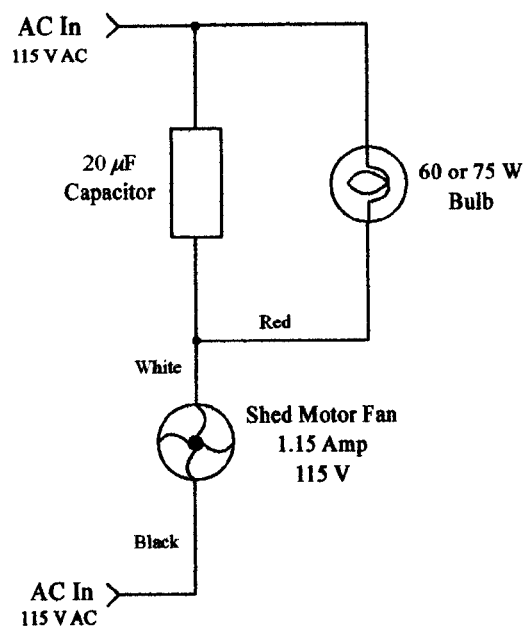
FIG. 46 is a schematic diagram of an embodiment using a light bulb.

FIG. 46 illustrates an embodiment of the present disclosure that conserves light bulb energy. In a test conducted, on Nov. 16, 1998, a light bulb was installed according to the schematic disclosed in FIG. 46 and is still running seven years later.

Since Apparent Power (VA)=Current (A)×Voltage (V), the calculations below illustrate energy conservation for a 60 W light bulb. The voltage applied at the power input is 115 V. The apparent power for the Power Input Line (Line PIN) is measured at 126.5 VA. The apparent power measured for the shed motor fan is 126.5 VA and the apparent power measured for the light bulb is 65 VA. Therefore, 126 VA is measured at the input and a total of 191.5 VA is measured at the output, indicating an approximately 1.5 gain. Calculations are also shown for the energy savings for a 75 W Bulb.

60 W Bulb
Line PIN=1.1 A×115V=126.5 VA
Light Bulb=0.52 A×125V=65 VA
Shed Motor=1.1 A×115V=126.5 VA
Gain=(126.5 VA+65 VA)/126.5 VA=1.513 times
75 W Bulb
Line PIN=0.97 A×115V=111.55 VA
Light Bulb=0.57 A×100V=60.42 VA
Shed Motor Fan=0.97 A×115V=111.55 VA
Gain=(111.55 VA+60.42 VA)/111.55=1.54 times
Or
Shed Motor Fan=1.1 A×115V=126.5 VA
Light Bulb=60 W
Gain=(126.5 VA+60 VA)/111.55 VA=1.67 times Example Comparison Between Conventional Single-Phase Motor and Re-Wound Single-Phase Motor Appendix 1 illustrates the test setup for comparing a conventional single-phase motor to a re-wound single-phase motor.

Appendix 2 describes the test configuration and resulting data from the comparative tests. The tables compare the performance of a conventional Central Machinery Bench Grinder single-phase motor model #39798, 3450 rpm (already considered an energy-efficient motor), versus the same motor rewound using the inventive features of the present disclosure. The single-phase motor is rewound using four major winding groups (W1, W2, W3, and W4) with four sub-groups for W1 and W3 and two sub-groups for W2 and W4, connected in series, as discussed above for wiring in series for a single-phase motor. FIG. 38 may be used as a guide, although there are three sub-groups for W1, W2, W3, and W4 shown.

The tests do not provide figures for the true power consumption of the conventional motor and re-wound motor, but a comparison of the data between the two motors shows that the re-wound motor conserves more energy. For example, the Line PIN of the conventional motor on load is measured at 345 VA and the power output measured is at 373.75 VA, whereas the Line PIN of the re-wound motor on load is measured at 184 VA and the power output measured is at 361 VA. The data illustrates that much less energy is consumed to generate a similar mechanical power output in the re-wound motor.

In general, the presently described apparatus, system and methods conserve energy by utilizing resonance theory in a system that includes a motor and an electric circuit. The resonance in the electric circuit occurs at a particular frequency when the inductive reactance and the capacitive reactance are of equal magnitude, causing electrical energy to oscillate between the magnetic field of the inductor and the electric field of the capacitor. Although the preceding description describes various embodiments of the system, the present disclosure is not limited to such embodiments, but rather covers all modifications, alternatives, and equivalents that fall within the spirit and scope of the invention. Since many embodiments can be made without departing from the spirit and scope of the present invention, the invention resides in the claims hereinafter appended.

What is claimed is:

1. An apparatus for efficient conversion of electrical energy from an electric power source to mechanical power, the apparatus comprising:
   an electromechanical device that is arranged to provide the mechanical power in response to the electrical energy from the electric power source;
   an inductor circuit that has a first associated reactance, wherein the inductor circuit is comprised of at least one winding in the electromechanical device;
   a capacitor circuit that is coupled in series with at least one winding from the inductor circuit, wherein the capacitor circuit has a second associated reactance, wherein the inductor circuit and the capacitor circuit have a resonance that occurs at a particular frequency when the first reactance is matched to the second reactance; and
   a component circuit that is coupled in parallel with the capacitor circuit, wherein the component circuit, the capacitor circuit, and the at least one winding from the inductor circuit are arranged in cooperation as a tank circuit that has a second resonance that occurs at a particular frequency such that electrical energy oscillates between a magnetic field of the inductor circuit and an electric field associated with the capacitor circuit and the component circuit.

2. The apparatus of claim 1, wherein the apparatus is further arranged for operation from one of an AC power source, a standard AC power outlet, and a DC power source.

3. The apparatus of claim 1, further comprising: a power inverter that is arranged to condition an AC power source to a DC electric power input for the apparatus.

4. The apparatus of claim 1, further comprising a DC drive circuit that is arranged to selectively charge the inductor circuit.

5. The apparatus of claim 4, wherein the DC drive circuit comprises:
   a first, second, third, and fourth transistor circuit, wherein: the first and second transistors are selectively activated during a first interval to charge a first winding of the inductor circuit in a first direction, the third and fourth transistors are selectively activated during a second interval to charge a second winding of the inductor circuit in a second direction; and
   a first, second, third, and fourth rectifier circuit, wherein: the first and second rectifiers are arranged to charge the capacitor circuit during the second interval, and the third and fourth rectifiers are arranged to charge the capacitor during the first interval.

6. The apparatus of claim 4, wherein the DC drive circuit comprises:
   a first, second, third, and fourth transistor circuit, wherein: the first transistor circuit includes a first collector that is coupled to a first terminal for a first winding of the inductor circuit, the second transistor circuit includes a second collector that is coupled to a second terminal for the first winding of the inductor circuit, the third transistor circuit includes a third collector that is coupled to a first terminal for a second winding of the inductor circuit, the fourth transistor circuit includes a fourth collector that is coupled to the second terminal for the second winding of the inductor circuit; and
   a first, second, third, and fourth rectifier circuit, wherein: the first rectifier circuit is coupled between a first terminal of the capacitor circuit and the first terminal of the first winding, the second rectifier circuit is coupled between the second terminal of the first winding and a second terminal of the capacitor circuit, the third rectifier circuit is coupled between the first terminal of the capacitor circuit and the second terminal of the second winding, the fourth rectifier circuit is coupled between the first terminal of the second winding and the second terminal of the capacitor circuit.

7. The apparatus of claim 6, wherein the first transistor circuit includes a first emitter that is arranged for operation from a first terminal of the power source, wherein the second transistor circuit includes a second emitter that is arranged for operation from a second terminal of the power source, wherein the third transistor circuit includes a third emitter that is arranged for operation from the first terminal of the power source, and wherein the fourth transistor circuit includes a fourth emitter that is arranged for operation from the second terminal of the power source.

8. The apparatus of claim 1, further comprising a DC drive circuit arranged to drive: a first current in a first winding of the inductor circuit, and a second current in a second winding of the inductor circuit, wherein a first direction associated with the first current is opposite a second direction associated with the second current.

9. The apparatus of claim 1, the electromechanical device comprising at least one member of the group comprising: a motor, a generator, a light bulb, a shaded motor, a stator motor, an induction motor, a steel-laminated core motor, a squirrel cage motor, a single-phase motor, a two-phase motor, a three-phase motor, a four-phase motor, and a multi-phase motor.

10. The apparatus of claim 1, the tank circuit comprising at least one of a parallel resonance circuit and a series resonance circuit.

11. The apparatus of claim 1, the inductor circuit comprising: a first single wire winding in the electromechanical; and, wherein the component circuit comprises at least one member of the group comprising: a second single wire winding in the electromechanical device, a first resistor, a second resistor that is series coupled to a second capacitor, a third capacitor, a primary side of a transformer, and a rectifier circuit.

12. The apparatus of claim 1, the inductor circuit comprising: a first single wire winding in the electromechanical device, and a second single wire winding in the electromechanical device, wherein the capacitor circuit is series coupled between the first single wire winding and the second single wire winding.

13. The apparatus of claim 12, the tank circuit further comprising: a component circuit that is coupled in parallel with the capacitor circuit, wherein the component circuit comprises at least one member of the group comprising: a first resistor, a second resistor that is coupled in series with a second capacitor, a third capacitor, a third single wire winding in the electromechanical device, a primary side of a transformer, and a rectifier circuit.

14. The apparatus of claim 1, the tank circuit further comprising: a first core in the electromechanical device, a second core in the electromechanical device, and a parallel circuit that is coupled between the first core and the second core, wherein the parallel circuit comprises at least one member of the group comprising: the capacitor circuit, the inductor circuit, a resistor circuit, a first parallel combination of the resistor circuit and the capacitor circuit, and a second parallel combination of the capacitor circuit and the inductor circuit.

15. An apparatus for efficient conversion of electrical energy from an electric power source to mechanical power, the apparatus comprising:
an electromechanical device that is arranged to provide the mechanical power in response to the electrical energy from the electric power source;
an inductor circuit arranged as a double wire winding in the electromechanical device, wherein the inductor circuit that has a first associated reactance; and
a capacitor circuit that has a second associated reactance, wherein the inductor circuit and the capacitor circuit are arranged to operate as a tank circuit that has a resonance that occurs at a particular frequency when the first reactance is matched to the second reactance such that electrical energy oscillates between a magnetic field of the inductor circuit and an electric field associated with the capacitor circuit.

16. The apparatus of claim 15, the tank circuit comprising: a double wire winding core in the electromechanical device that is wired in at least one of a series configuration and a parallel configuration, wherein the double wire winding core is coupled to at least one member of: the capacitor circuit, the inductor circuit, a first parallel combination of the capacitor circuit and the inductor circuit, a resistor circuit, a second parallel combination of the resistor circuit and the capacitor circuit, and a second double wire winding core in the electromechanical device.

17. The apparatus of claim 15, the inductor circuit comprising a double wire winding inductive coil that includes a first winding and a second winding, wherein the first winding is comprised of a first wire that is wound around a core, wherein the second winding is comprised of a second wire that is wound around the core in a common direction with the first wire, and wherein the first wire and the second wire are arranged according to one of: a single layer arrangement and a multiple layer arrangement.

18. The apparatus of claim 15, the inductor circuit comprising a double wire winding inductive coil that includes a first winding and a second winding, wherein the first winding is comprised of a first wire that is wound around a core from a starting position, wherein the second winding is comprised of a second wire that is wound around the core in a common direction with the first wire from the same starting position, wherein the first and second wires are further wound around the core a second time from the same starting position to form a multi-layer arrangement.

19. The apparatus of claim 18, wherein the double wire winding inductive coil is arranged such that the first wire and the second wire each include a negative end and a positive end, wherein the negative end of the first wire is located adjacent to the positive end of the second wire, and wherein the positive end of the first wire is located adjacent to the negative end of the second wire.

20. The apparatus of claim 19, further comprising: a first power line node that is coupled to the negative end of the first wire and a second power line node that is coupled to the negative end of the second wire, wherein a component circuit is coupled between the positive end of the first wire and the positive end of the second wire, wherein the component circuit comprises at least one member of the group comprising: a wire, the capacitor circuit, a single wire winding inductive coil, a second double wire winding inductive coil, a resistor circuit, a rectifier circuit, a primary side of a transformer, the capacitor circuit coupled in parallel with the second double wire winding inductive coil, the capacitor circuit coupled in parallel with the resistor circuit, the capacitor circuit coupled in parallel with the rectifier circuit, and the capacitor circuit coupled in parallel with the primary side of the transformer, wherein the tank circuit is arranged to operate when power is applied across the first power line node and the second power line node.

21. The apparatus of claim 19, wherein the first double wire winding inductive coil is arranged such that: a first power line node is coupled to the negative end of the first wire and the positive end of the second wire, and a second power line node is coupled to the positive end of the first wire and the negative end of the second wire through a component circuit, wherein the component circuit comprises at least one member of the group comprising: a wire, the capacitor circuit, a resistor circuit, and the capacitor circuit in parallel with the resistor circuit, wherein the tank circuit is arranged to operate when power is applied across the first power line node and the second power line node.

22. The apparatus of claim 19, further comprising: a second double wire winding inductive coil that includes a third winding and a fourth winding, wherein the third winding is comprised of a third wire that is wound around a second core, wherein the fourth winding is comprised of a fourth wire that is wound around the second core in a second common direction with the third wire, wherein the second double wire winding inductive coil is arranged such that the third wire and the fourth wire each include a negative end and a positive end, wherein the negative end of the third wire is located adjacent to the positive end of the fourth wire, and wherein the positive end of the third wire is located adjacent to the negative end of the fourth wire.

23. The apparatus of claim 22, further comprising: a first power line node that is coupled to the negative end of the first wire, and a second power line node that is coupled to the negative end of the second wire, wherein the second double wire winding inductive coil is arranged such that the negative end of the third wire is coupled to the positive end of the second wire and the negative end of the fourth wire is coupled to the positive end of the first wire, wherein the tank circuit is arranged to operate when power is applied across the first power line node and the second power line node.

24. The apparatus of claim 22, further comprising a component circuit that is coupled between the positive end of the third wire and the positive end of the fourth wire, wherein the component circuit comprises at least one member of the group comprising: the capacitor circuit, a single wire winding inductive coil, a resistor circuit, a rectifier circuit, a primary side of a transformer, the capacitor circuit coupled in parallel with the single wire winding inductive coil, the capacitor circuit coupled in parallel with the resistor circuit, the capacitor circuit coupled in parallel with the rectifier circuit, and the capacitor circuit coupled in parallel with the primary side of the transformer.

25. The apparatus of claim 22, wherein the first double wire winding inductive coil is arranged such that: a first power line node is coupled to the negative end of the first wire and the positive end of the second wire, and the positive end of the first wire and the negative end of the second wire are coupled to a first node, and wherein the second double wire winding inductive coil is arranged such that: a second power line node is coupled to the positive end of the third wire and the negative end of the fourth wire, and the negative end of the third wire and the positive end of the fourth wire are coupled to a second node, wherein the first node is coupled to the second node through a component circuit that comprises at least one member of the group comprising: a wire, the capacitor circuit, a resistor circuit, and the capacitor circuit in parallel with the resistor circuit, wherein the tank circuit is arranged to operate when power is applied across the first power line node and the second power line node.

26. An apparatus for efficient conversion of electrical energy from an electric power source to mechanical power, the apparatus comprising:
   an electromechanical device that is arranged to provide the mechanical power in response to the electrical energy from the electric power source;
   an inductor circuit in the electromechanical device that has a first associated reactance, wherein the inductor circuit includes a first winding, a second winding, a third winding, and a fourth winding, wherein the inductor circuit has a first associated reactance;
   a first capacitor circuit that has a second associated reactance, wherein the first and second windings of the inductor circuit are arranged to cooperate with the first capacitor circuit as a tank circuit that has a first resonance that occurs at a first frequency when the first reactance is matched to the second reactance such that electrical energy oscillates between a magnetic field of the inductor circuit and an electric field associated with the first capacitor circuit; and
   a second capacitor circuit that has a third associated reactance, wherein the third and fourth windings of the inductor circuit are arranged to cooperate with the second capacitor circuit as a second tank circuit that has a second resonance that occurs at a second frequency when the first reactance is matched to the third reactance such that electrical energy oscillates between a magnetic field of the inductor circuit and an electric field associated with the second capacitor circuit.

27. An apparatus for efficient conversion of electrical energy from an electric power source to mechanical power, the apparatus:
   an electromechanical device that is arranged to provide the mechanical power in response to the electrical energy from the electric power source;
   an inductor circuit in the electromechanical device that has a first associated reactance, wherein the inductor circuit includes a first inductive winding and a second inductive winding;
   a capacitor circuit that has a second associated reactance, wherein the first and second inductive windings of the inductor circuit are arranged to cooperate with the first capacitor circuit as a tank circuit that has a resonance that occurs at a particular frequency when the first reactance is matched to the second reactance such that electrical energy oscillates between a magnetic field of the inductor and an electric field associated with the capacitor circuit;
   a rectifier circuit that is coupled to an AC input power source, wherein the rectifier circuit is arranged to provide a DC power source;
   a first H-bridge drive circuit that is arranged for operation from the DC power source, wherein the first H-bridge drive circuit is configured to drive the first inductive winding circuit; and
   a second H-bridge drive circuit that is also arranged for operation from the DC power source, wherein the second H-bridge drive circuit is configured to drive the second inductive winding circuit.

28. The apparatus of claim 27, the first inductive winding circuit further comprising at least one member of the group comprising: a single wire winding that is coupled in series to a first capacitor circuit that is coupled in parallel with a component circuit, and a double wire winding that is coupled in parallel to the component circuit, wherein the component circuit comprises at least one member of the group comprising: a second rectifier circuit, a second capacitor, and the second capacitor coupled to an output of the second rectifier circuit.

29. The apparatus of claim 27, the second inductive winding circuit further comprising at least one member of the group comprising: a first single wire winding that is coupled in parallel with a first capacitor, a second single wire winding that is coupled in series with a second capacitor, and a double wire winding that is coupled in parallel with a third capacitor.

30. An apparatus for efficient conversion of electrical energy from a power source to mechanical power, the apparatus comprising:
   an electromechanical device that is arranged to provide the mechanical power in response to the electrical energy from the electric power source;
   an inductive winding in the electromechanical device;
   a capacitor circuit that is arranged in cooperation with the inductive winding to form a resonant circuit, wherein the resonant circuit is arranged such that:
   during a first quarter cycle associated with the electric power source, a first current from the electric power source is stored in the inductor circuit and the capacitor circuit is charged with the first current from a first direction;
   during a second quarter cycle associated with the electric power source, the stored current is released from the inductor circuit and the capacitor circuit discharges to a component circuit in a forward direction, wherein the component circuit comprises at least one of a second inductive winding in the electromechanical device, and a resistive load circuit;
   during a third quarter cycle associated with the electric power source, a second current charges the capacitor circuit from a second direction that is opposite the first direction; and
   during a fourth quarter cycle associated with the electric power source, the capacitor circuit discharges to the component circuit in a backward direction and the inductive winding releases current to the electric power source.

31. The apparatus of claim 30, wherein the inductive winding is wound around a core.

32. The apparatus of claim 30, wherein the electromechanical device comprises at least one of a motor and a generator.

33. A method for efficient conversion of electrical energy from an electric power source to mechanical power in an electromechanical device, the method comprising:

during a first quarter cycle associated with the electric power source:

providing a first current from the electric power source, storing the first current in an inductor circuit associated with the electromechanical device, and charging a capacitor circuit with the first current from a first direction;

during a second quarter cycle associated with the electric power source:

releasing stored current from the inductor to a selected one of a load circuit and a second inductor circuit that is also associated with the electromechanical device, and discharging the capacitor circuit to the selected one of the load circuit and the second inductor circuit in a forward direction;

during a third quarter cycle associated with the electric power source:

charging the capacitor circuit from a second direction that is opposite the first direction; and during a fourth quarter cycle associated with the electric power source:

discharging the capacitor circuit to the selected one of the load circuit and the second inductor circuit in a backward direction, and releasing current to the electric power source, wherein the method is arranged such that power conservation is improved by more than 100%.

* * * * *